United States Patent
Toyosawa et al.

(10) Patent No.: US 6,491,454 B1
(45) Date of Patent: Dec. 10, 2002

(54) TAPE PRINTING DEVICE AND METHOD

(75) Inventors: Yoshiya Toyosawa, Suwa (JP); Kenji Watanabe, Chiyoda-ku (JP); Takeshi Hosokawa, Suwa (JP)

(73) Assignees: Seiko Epson Corporation, Tokyo (JP); King Jim Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/253,104

(22) Filed: Feb. 19, 1999

Related U.S. Application Data

(62) Division of application No. 08/365,366, filed on Dec. 28, 1994, now Pat. No. 5,885,016.

(30) Foreign Application Priority Data

Dec. 22, 1993 (JP) .............................. 5-325164
Dec. 30, 1993 (JP) .............................. 5-350161

(51) Int. Cl.⁷ ................................................ B41J 3/46
(52) U.S. Cl. .......................................... 400/83; 400/613
(58) Field of Search ...................... 400/83, 613, 615.2, 400/621, 61, 70, 76; 395/102

(56) References Cited

U.S. PATENT DOCUMENTS

| | | | |
|---|---|---|---|
| 3,654,609 A | 4/1972 | Bluethman | 340/172.5 |
| 4,734,689 A | 3/1988 | Kurakake | |
| 5,038,138 A | 8/1991 | Akiyama et al. | 340/724 |
| 5,179,648 A | 1/1993 | Hauck | 395/145 |
| 5,222,818 A | 6/1993 | Akiyama et al. | 400/61 |
| 5,223,939 A | 6/1993 | Imaizumi et al. | 358/296 |
| 5,253,334 A | 10/1993 | Kimura et al. | 395/102 |
| 5,399,030 A | 3/1995 | Niwa et al. | 400/61 |
| 5,403,101 A | 4/1995 | Nagase et al. | 400/3 |
| 5,435,659 A | 7/1995 | Ueno | 400/615.2 |
| 5,462,372 A | 10/1995 | Hirono | 400/615.2 |
| 5,494,360 A | 2/1996 | Watanabe et al. | 400/83 |
| 5,595,450 A * | 1/1997 | Beadman et al. | 400/615.2 |
| 5,599,119 A * | 2/1997 | Nunokawa et al. | 400/621 |
| 5,651,619 A | 7/1997 | Nunokawa et al. | 400/83 |

FOREIGN PATENT DOCUMENTS

| | | | |
|---|---|---|---|
| JP | 58-70341 | | 4/1983 |
| JP | 58-192145 | | 11/1983 |
| JP | 60-111283 | | 6/1985 |
| JP | 60-207951 | | 10/1985 |
| JP | 62-24360 | | 2/1987 |
| JP | 04-182179 | * | 6/1992 |
| JP | 5-18853 | | 3/1993 |
| JP | 06-40116 | | 2/1994 |

* cited by examiner

Primary Examiner—Ren Yan
(74) Attorney, Agent, or Firm—Beyer Weaver & Thomas LLP

(57) ABSTRACT

A tape printing apparatus and method for printing a series of characters on a tape including an input device to input a series of characters, and a display device coupled to the input device and configured to display the series of characters. A tape length calculator is coupled to the input device to automatically calculate a total length of tape to be printed based upon the series of characters. The printing apparatus further includes a unit selector to convert the total length into a displayed length of a selected unit of length selected from at least two different choices of units of length, and a tape length display for displaying the displayed length in the selected unit of length prior to printing. A storage device is coupled to the unit selector and is adapted to store the length unit as a selected display unit.

16 Claims, 33 Drawing Sheets

CONTENTS — INDICATION OF LINE NUMBERS

Fig. 12(A) THREE LINES EXIST.
CURSOR IS POSITIONED ON THE SECOND LINE.

Fig. 12(B) FOUR LINES EXIST.
CURSOR IS POSITIONED ON THE FIRST LINE.

TITLE: 'VHS: HORIZONTAL'

| FORMAT FIXED LENGTH: LEFT-WEIGHT 14cm / LITTLE BLANK (ONLY 18mm TAPE) | | |
|---|---|---|
| STYLE | MODE | TEXT |
| LINE 1: L / BOLD<br>LINE 2: f | UNDERLINE<br>ALPHABET 1 | ▯[I]<br>▯▶[CH]<br>▯▶DATE:[CH]\_TIME:[CH]min |

[I] : ICON    [CH] : CHARACTER

FILM TITLE
DATE:93.12.16 TIME:45min

TITLE: 'VHS: VERTICAL'
| | FORMAT FIXED LENGTH: LEFT-WEIGHT 14cm / LITTLE BLANK (ONLY 18mm TAPE) | |
|---|---|---|
| STYLE | MODE | TEXT |
| LINE 1: M / VERTICAL / BOLD<br>LINE 1: M / VERTICAL<br>LINE 2: b / VERTICAL | ITALICS / CLOSE<br>ITALICS<br>ITALICS | ◧ I<br>◧ ▲ CH<br>◧ □ ▲ CH  ※1<br>② □ ▲ CH  ※2 |
I : ICON    CH : CHARACTER    *1: OPEN SQUARE DENOTES SPECIFIED ICON.
*2: OPEN SQUARE DENOTES SPECIFIED ICON.
Fig. 16(A)
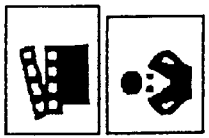
FILM TITLE    DIRECTOR
              CAST
Fig. 16(B)

Fig. 17(A)

TITLE: 'VHS-C'

| FORMAT FIXED LENGTH: LEFT-WEIGHT 4.4cm / VERY LITTLE BLANK (ONLY 12mm TAPE) | | |
|---|---|---|
| STYLE | MODE | TEXT |
| LINE 1: L<br>LINE 2: f | NARROW<br>UNDERLINE / CLOSE<br>ALPHABET 1 / CLOSE | ①▶[I]<br>①▶[CH]<br>②▶DATE:[CH] |

[I] : ICON  [CH] : CHARACTER

Fig. 17(B)

🎬 TITLE
DATE:93.3.3

TITLE: '8mm VIDEO'

| FORMAT FIXED LENGTH: LEFT-WEIGHT 7.5cm / LITTLE BLANK (ONLY 12mm TAPE) | | | |
|---|---|---|---|
| STYLE | MODE | | TEXT |
| LINE 1: L / BOLD<br>LINE 2: f | NARROW<br>UNDERLINE / CLOSE<br>ALPHABET 1 / NARROW | | ◨▶ [I]<br>◨▶ [CH]<br>◪▶ D A T E : [CH] |
| | | [I] : ICON [CH] : CHARACTER | |

TITLE
DATE:93.11.3

Fig. 19(A)

TITLE: 'CASSETTE TAPE'

| FORMAT FIXED LENGTH: LAYOUT 9.0cm / LITTLE BLANK (ONLY 9mm TAPE) | | |
|---|---|---|
| STYLE | MODE | TEXT |
| LINE 2: f / CENTER / MUSIC SCORE | COMPRESS / ITALICS | ❶▲[CH]<br>❷[CH] |

[CH] : CHARACTER

Fig. 19(B)

TITLE  RADIO AIR CHECK

TITLE: 'NAME & ADDRESS'

FORMAT DEFAULT (9, 12, 18mm TAPES)

| STYLE | MODE | TEXT |
|---|---|---|
| AUTO / CENTER/ WITH PIN MARKS | UNDERLINE | ❶▶ [I][CH]<br>❷ ZIP[CH]<br>❸ □[CH]<br>※3. |

[I] : ICON  [CH] : CHARACTER  *3: OPEN SQUARE DENOTES SPECIFIED ICON.

Fig. 21(A)

TITLE: 'NAME PLATE'

FORMAT DEFAULT

| STYLE | MODE | TEXT |
|---|---|---|
| LINE 1: L / WAVE RULE | ALPHABET 2 | ▶ [I] [CH] [I] |

[I] : ICON  [CH] : CHARACTER

Fig. 21(B)

*T.OBATA*

TITLE: 'IDENTIFICATION TAG'

FORMAT DEFAULT (9, 12, 18mm TAPES)

| STYLE | MODE | TEXT |
|---|---|---|
| LINE 1: M / BOLD<br>LINE 3: g/ BOLD | ITALICS / NARROW<br>THIN / ITALICS / NARROW<br>ITALICS / NARROW<br>THIN / ITALICS / NARROW | ■ ▶ [CH] ▲ CLASS<br>■ ▶ NAME<br>■ ❷ ❸<br>■ ▶ [CH] |
| LINE 1: L/ BOLD | CLOSE | |

[CH] : CHARACTER

Fig. 22(A)

| CLASS | NAME | □ □ △ △ |
|---|---|---|

Fig. 22(B)

Fig. 36
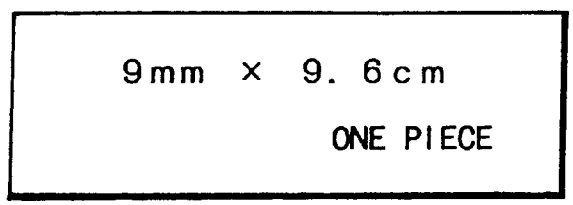
Fig. 37
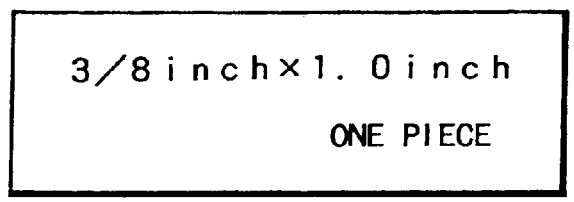
Fig. 38
| DOT NUMBER | inch | cm |
|---|---|---|
| ⋮ | ⋮ | ⋮ |
| 90 | 1/2 | 1.27 |
| ⋮ | ⋮ | ⋮ |
| 180 | 1 | 2.54 |
| ⋮ | ⋮ | ⋮ |

TAPE PRINTING DEVICE AND METHOD

This is a Divisional application Ser. No. 08/365,366 filed on Dec. 28, 1994, now U.S. Pat. No. 5,885,016, the disclosure of which is incorporated herein by reference.

BACKGROUND OF THE INVENTION

1. Field of the Invention

The present invention relates to a method of editing text data to be printed in a plurality of lines as well as to a printing device for printing the edited text data in the plurality of lines.

2. Description of the Related Art

Among a variety of printing devices generally known, there are small-sized printing devices for printing desired text data on a surface of an adhesive tape having an adhesive rear face. With such a tape printing device, a desirable title or name is printed on a label (cut piece of a tape) through simple operation. These labels with an adhesive are applied in both domestic and business fields, for example, on the spine of business files or the back of video tapes.

A high-functional, value-added printing device has been developed to allow text data to be printed in a plurality of lines on the tape. Tape cartridges used for the printing device may accommodate transferable tapes and those of various colors and widths other than the conventional adhesive tapes.

The value-added function of printing text data in a plurality of lines, however, leads to increase the size of the device undesirably, thereby damaging the advantages of the portable printing device. The size increase of the high-functional printing device is mainly attributable to a large display unit for editing text data of plural lines.

Simple down-sizing of the display makes it difficult to check and observe information and data on the display. Another possible structure for the down-sizing shows only part of text data to be edited. This deteriorates the efficiency of editing procedures and may result in waste of the tape since mistakes are often found after the printing on the tape.

There is a known function applicable to the printing device, which calculates a required length for input text data and displays the required length of the tape. A fixed unit of length is, however, confusing since some nations adopt the metric system whereas other nations use the inch-yard system. Calculation results of the required length based on the input text data may cause display of rather complicated numbers with decimal point.

SUMMARY OF THE INVENTION

One object of the invention is accordingly to provide a printing device having a small display unit which allows the user to easily check and observe data and information without deteriorating the efficiency of editing procedures.

Another object of the invention is to provide a method of editing data with such a printing device.

The above and other related objects are realized by a tape printing device for editing data of up to 'n' lines, where 'n' is an integer at least 2, and printing the edited data in 'm' lines, where 'm' is an integer between 1 to the maximum line number 'n'. In the tape printing device of the invention, the edited data are displayed on a main display unit in 'p' lines, where 'p' is an integer between 1 to 'n'−1. A line currently edited is displayed as a digit on an auxiliary display unit. The data which occupies a relative large display area and includes data of the line currently edited are displayed on the main display unit while the current editing position is indicated on the auxiliary display unit.

The invention is also directed to another tape printing device for editing data of up to 'n' lines, where 'n' is an integer at least 2, and printing the edited data in 'm' lines, where 'm' is an integer between 1 to 'n'. In the tape printing device of the invention, the edited data are displayed on a display unit in 'p' lines, where 'p' is an integer between 1 and the maximum line number 'n'. The data displayed on the display unit can be scrolled along each line. A digit representing a line number at a head of the data displayed on the display unit is indicated in either of the following forms. When the data is scrolled to make the head of the data reach an end of the display unit and further scrolled to be out of a display area of the display unit, the digit representing a line number is indicated at a fixed position on the end of the display unit. When the data is scrolled to make the head of the data reach the end of the display unit and further scrolled to be within the display area of the display unit, the digit representing a line number is indicated at the head of the data.

According to another aspect of the invention, a tape printing device for printing data on a tape or recording medium inputs data, prints the input data on the tape, and cuts the tape with the data printed thereon at a specified length. The specified length of the tape with the data printed thereon is displayed together with a unit of length on the display unit prior to the printing procedures. The unit of length can be selected among a plurality of choices.

The invention is further directed to a method of displaying and editing data to be printed on a tape or recording medium utilizing a main display unit for displaying the edited data of 'p' lines, where 'p' is an integer, and an auxiliary display unit disposed near the main display unit for executing an auxiliary display with digits. The method includes the steps of:

(1) editing data of a maximum line number 'n', where 'n' is an integer between 1 to the line number 'p' displayed on the main display unit;

(2) controlling the editing procedure of the data and displaying the data including data of a line currently edited on the main display unit; and (3) indicating the line currently edited on the auxiliary display unit.

The invention also pertains to another method of displaying and editing data to be printed on a tape or recording medium utilizing a display unit for displaying the edited data of 'p' lines, where 'p' is an integer. The method includes the steps of:

(1) editing data of a maximum line number 'n', where 'n' is an integer between 1 to the line number 'p', displayed on the display unit;

(2) controlling the editing procedure of the data to display the data including data of a line currently edited on the display unit;

(3) scrolling the data along the line on the display unit; and (4) indicating a digit representing a line number at a head of the data displayed on the display unit, the step (4) further including the steps of:

(4-1) when the data is scrolled to make the head of the data reach an end of the display unit and further scrolled to be out of a display area of the display unit, displaying the digit representing a line number at a fixed position on the end of the display unit; and (4-2) when the data is scrolled to make the head of the data reach the end of the display unit and further scrolled to be within the display area of the display unit, displaying the digit representing a line number at the head of the data.

According to another aspect of the invention, a method of displaying and editing data to be printed on a tape or recording medium includes the steps of:

inputting data;

calculating a length of the tape which is sufficient for the input data printed thereon and includes a certain blank;

specifying a unit of length applied to the length of the tape; and displaying the calculated length of the tape with the specified unit of length.

These and other objects, features, aspects, and advantages of the present invention will become more apparent from the following detailed description of the preferred embodiments with the accompanying drawings.

BRIEF DESCRIPTION OF THE DRAWINGS

FIGS. 12A and 12B show exemplified displays on the display unit 50D according to the text data displaying process;

FIGS. 15(a), 15(b), 16(a), 16(b), 17(a), 17(b), 18(a), 18(b), 19(a), 19(b), 20(a), 20(b), 21(a), 21(b), 22(a), 22(b), show various application forms applicable to the processing of FIG. 14;

FIG. 36 shows an exemplified display by 'cm';

FIG. 37 shows an exemplified display by 'inch';

FIG. 38 shows a conversion table between the dot number, 'inch', and 'cm'; and

DESCRIPTION OF THE PREFERRED EMBODIMENT

Structure and functions of the present invention will become more apparent through description of the following preferred embodiments of the invention.

A tape printing device of a first embodiment, in which a plurality of tape cartridges are detachably and replaceably attached, prints text data on a tape accommodated in each tape cartridge. Both an ink ribbon and a tape on which text data are printed with the ink ribbon are accommodated in one cartridge in this embodiment. This cartridge for the ink ribbon and the tape is hereinafter referred to as the tape cartridge.

A. Hardware Configuration

Figure 1:
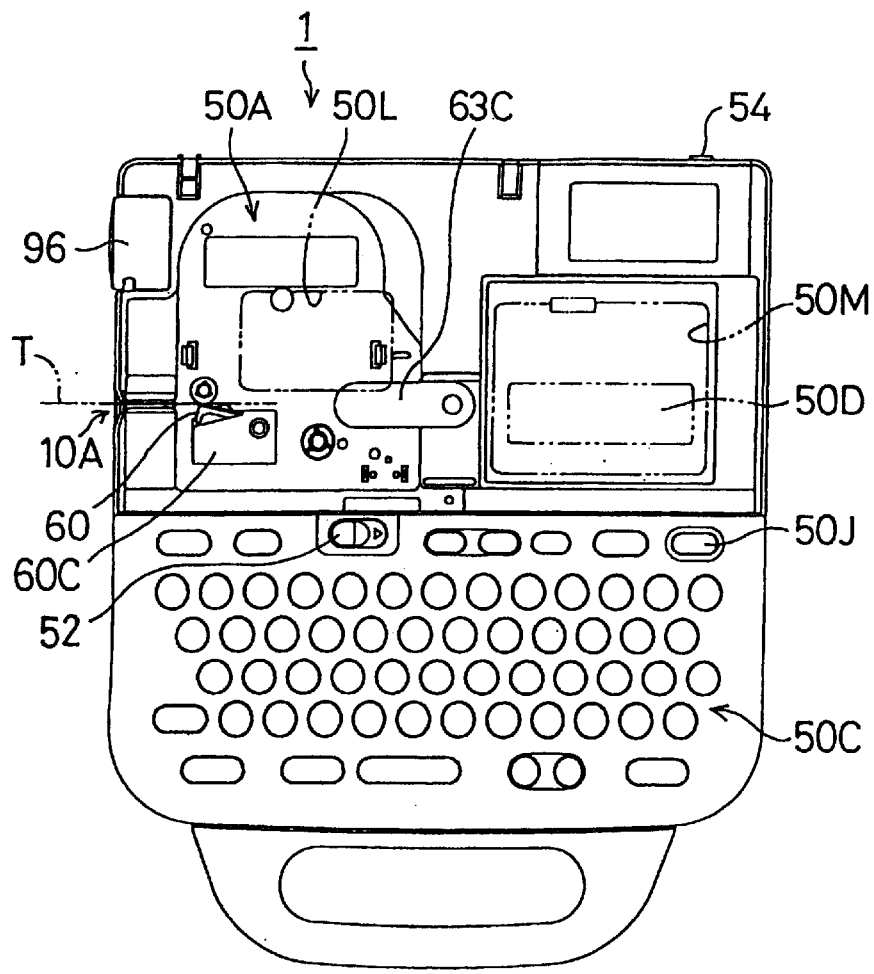
FIG. 1 is a plan view illustrating a tape printing device 1 embodying the invention.
Figure 2:
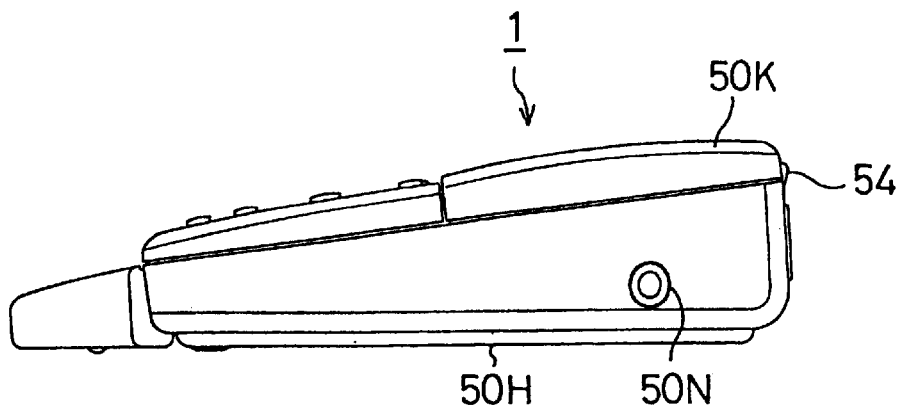
FIG. 2 is a right side view of the tape printing device 1.

As illustrated in FIGS. 1 and 2, the tape printing device 1 includes a casing 50H for accommodating a variety of constituents, an input unit 50C having sixty-two keys, a freely openable cover 50K, a display unit 50D arranged visibly through a window 50M formed on the cover 50K for displaying a series of text data and required information, and a tape cartridge holder unit 50A (not shown in FIG. 1) which is disposed on a left upper portion of the device 1 and detachably and replaceably receives a tape cartridge 10. The cover 50K is provided with another window 50L for checking attachment of the tape cartridge 10 as well as the window 50M through which the display unit 50D is observable. Both the windows 50L and 50M are covered with transparent plastic plates. A detection switch 55 (see FIG. 7) monitors opening and closing operations of the cover 50K.

Operation of the tape printing device 1 thus constructed is described briefly. An operator first opens the cover 50K and attaches the tape cartridge 10 into the tape cartridge holder unit 50A. After closing the cover 50K, the operator actuates a head shift lever 63C (see FIG. 4 described later) to shift a head to a printable position and subsequently presses a power switch button 50J to supply electric power. The device 1 is now ready for an input of letters or characters. The operator then operates the keys on the input unit 50C to input a desirable series of letters or characters to be printed. The series of letters may be input directly as text data or otherwise converted to specific characters such as Chinese characters, symbols, or words according to the requirements.

In response to a printing instruction through a specific key operation, the tape printing device 1 drives a thermal transfer printer unit 50B (described later) to start printing on a tape T fed from the tape cartridge 10. The tape T with the letters and characters printed thereon is fed out of a tape outlet 10A disposed on a left side wall of the tape printing device 1. The tape T used in the embodiment has a printing surface specifically processed to ensure favorable ink-spread properties by thermal transfer, and an adhesive rear face which a peel tape is closely applied on. After the printed tape T is cut to a label of a desirable length with a built-in blade cutter and the peel tape on the rear face of the tape T is peeled off, the label with characters and symbols printed thereon is applied onto any desirable place.

The tape printing device 1 is further provided on a bottom face thereof with a battery holder unit (not shown) for receiving six SUM-3 cells working as a power source of the whole device 1. The required power is alternatively supplied by inserting an AC power cord (not shown) into a jack 50N on the right side wall of the device 1.

Figure 3:
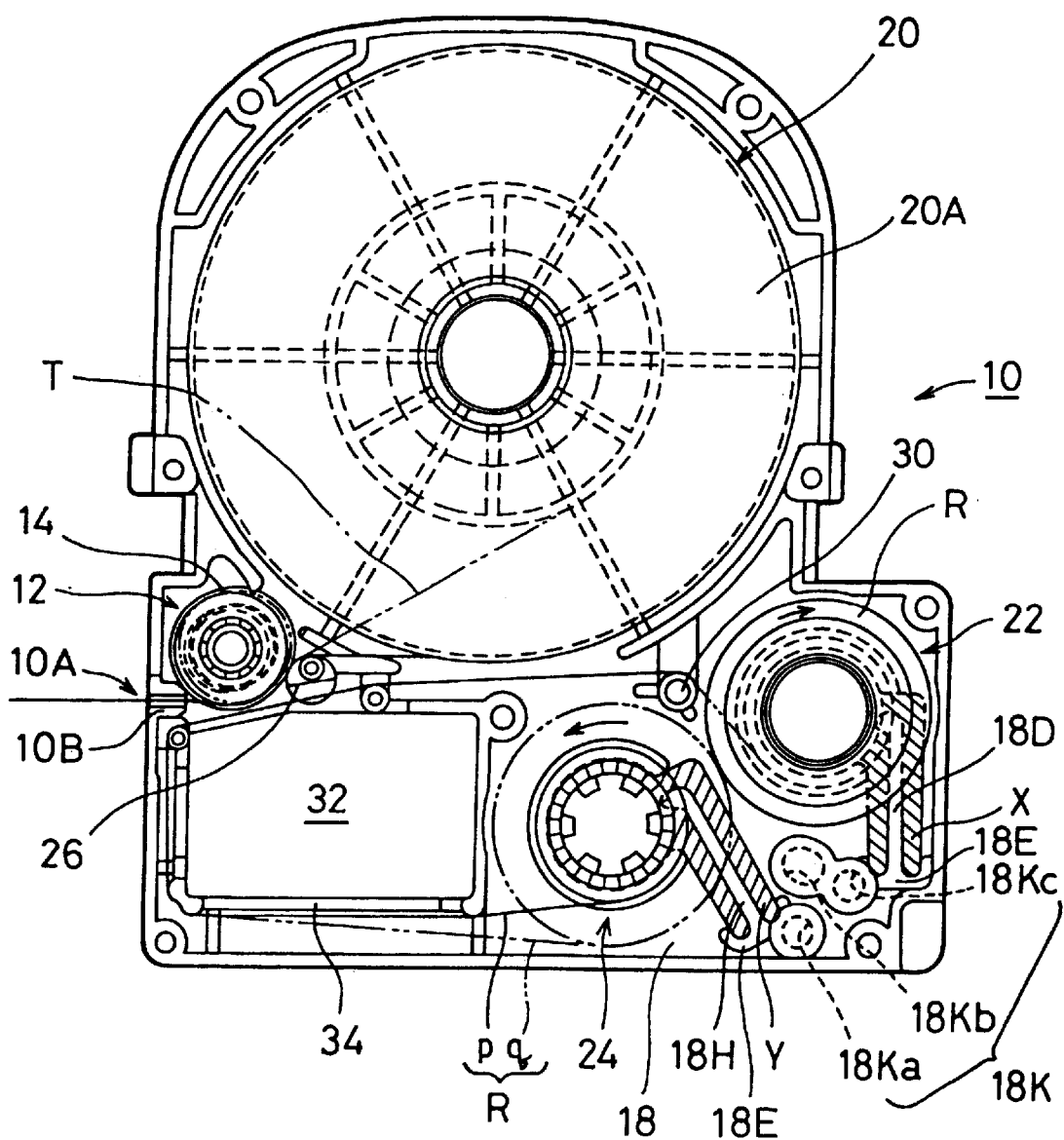
FIG. 3 is a plane view showing assembly of a tape cartridge 10 attached in the tape printing device 1.

Structure and functions of the tape cartridge 10 are described mainly based on the plan view of FIG. 3. The tape cartridge 10 includes a tape core 20 which a long tape T is wound on, an ink ribbon core 22 which an ink ribbon R used for printing is initially wound on, a ribbon winding core 24 which the ink ribbon R is wound up, and a platen 12. The tape T is held between the platen 12 and a printing head 60 for the printing procedures. The tape cartridge 10 can receive tapes of different widths in similar configurations. In the embodiment, five tape cartridges respectively accommodating tapes of 6 mm, 9 mm, 12 mm, 18 mm, and 24 mm in width are prepared in the embodiment.

The platen 12 is a hollow cylindrical member covered with a platen rubber 14 of a predetermined width corresponding to the width of the tape T. The platen rubber 14 improves contact of the tape T and the ink ribbon R with the printing head 60 for desirable printing. In the embodiment, two types of platen rubber 14 are used; a 12 mm wide platen rubber for 6 mm, 9 mm, and 12 mm tapes, and a 18 mm wide platen rubber for 18 mm and 24 mm tapes.

The platen 12 is fitted in apertures formed on a top wall and a bottom wall of the tape cartridge 10 to allow pivotal movement of the platen 12. As described previously, the tape T on the tape core 20 and the ink ribbon R on the ink ribbon core 22 and the ribbon winding core 24 are arranged in a compact manner in the tape cartridge 10. The ink ribbon core 22 and the ribbon winding core 24 are also fitted in apertures formed on the top wall and the bottom wall of the tape cartridge 20 to allow pivotal movement of the respective cores 22 and 24. The tape cartridge 10 further includes a printing head receiving hole 32 which the printing head 60 goes in and out. The printing head receiving hole 32 is defined by a guide wall 34.

The tape core 20 is a hollow, large-diametral cylindrical reel having a configuration to receive the long tape T in a relatively small space. This structure allows even a tape T having a small curvature and small resistance against the bending stress to be accommodated under preferable conditions. The tape wound on the tape core 20 runs to the platen 12 via a tape guide pin 26 projecting upright from the bottom wall 18 of the tape cartridge 10 and is further led to a tape outlet 10A of the tape cartridge 10.

As shown in FIG. 3, substantially L-shaped engagement pieces 18D and 18H are formed on the bottom wall 18 of the tape cartridge 10 to be positioned in the vicinity of the lower ends of the ink ribbon core 22 and the ribbon winding core 24. The engagement pieces 18D and 18H are formed by cutting specific portions of the bottom wall 18 of the tape cartridge 10 (hatched portions designated as X and Y in FIG. 3). Resilience of the material of the bottom wall 18 allows respective free ends of the engagement pieces 18D and 18H to be movable around base portions 18E integrally formed with the bottom wall 18 and along the plane of the bottom wall 18. Upon condition that no force is applied onto the engagement pieces 18D and 18H, the free ends of the engagement pieces 18D are respectively positioned inside the circumferences of the ink ribbon core 22 and the ribbon winding core 24. The respective free ends accordingly engage with any of six engagement fingers formed on the ink ribbon core 22 and the ribbon winding core 24 movably fitted in the apertures, so as to prevent unintentional rotations of the ink ribbon core 22 and the ribbon winding core 24. The engagement of the ink ribbon core 22 with the engagement piece 18D and that of the ribbon winding core 24 and the engagement piece 18H are released by attaching the tape cartridge 10 in the tape cartridge holder unit 50A. The releasing mechanism will be described later with the structure of the tape cartridge holder unit 50A.

The ink ribbon R wound on and pulled out of the ink ribbon core 22 is guided by a ribbon guide roller 30 and is fed with the tape T to the platen 12. The ink ribbon R is further led to the ribbon winding core 24 via the guide wall 34 formed on the circumference of the printing head receiving hole 32 which the printing head 60 goes in and out. In the drawing of FIG. 3, p and q show the running conditions of the ink ribbon R when the tape cartridge 10 is new and unused, that is, when only a starting end of the ink ribbon R is on the ribbon winding core 24, and when the whole ink ribbon R is wound on the ribbon winding core 24, respectively.

The ink ribbon R wound up the ribbon winding core 24 is a thermal transfer ribbon having a specific width determined according to the width of the tape T on which characters are printed. In this embodiment, a 12 mm wide ink ribbon R is used for 6 mm, 9 mm, and 12 mm wide tapes T, a 18 mm wide ink ribbon R for a 18 mm wide tape T, and a 24 mm wide ink ribbon R for a 24 mm wide tape T.

As described previously, five tape cartridges 10 of different tape widths are applicable to the tape printing device 1 of the embodiment. A printable range of the tape T differs according to the width of the tape T, and it is thus required to detect the type of the tape cartridge 10. The tape cartridge 10 of the embodiment has first through third detection holes 18K$a$, 18K$b$, and 18K$c$, which are formed on the bottom wall 18 to allow discrimination of the tape cartridges 10. Namely, depths of the three detection holes 18K$a$, 18K$b$, and 18K$c$ are varied according to the width of the tape T accommodated in the tape cartridge 10. A sensor arranged at a suitable position detects the widths of the respective detection holes 18K to distinguish the maximum of seven tape cartridges 10 from one another.

Figure 4:
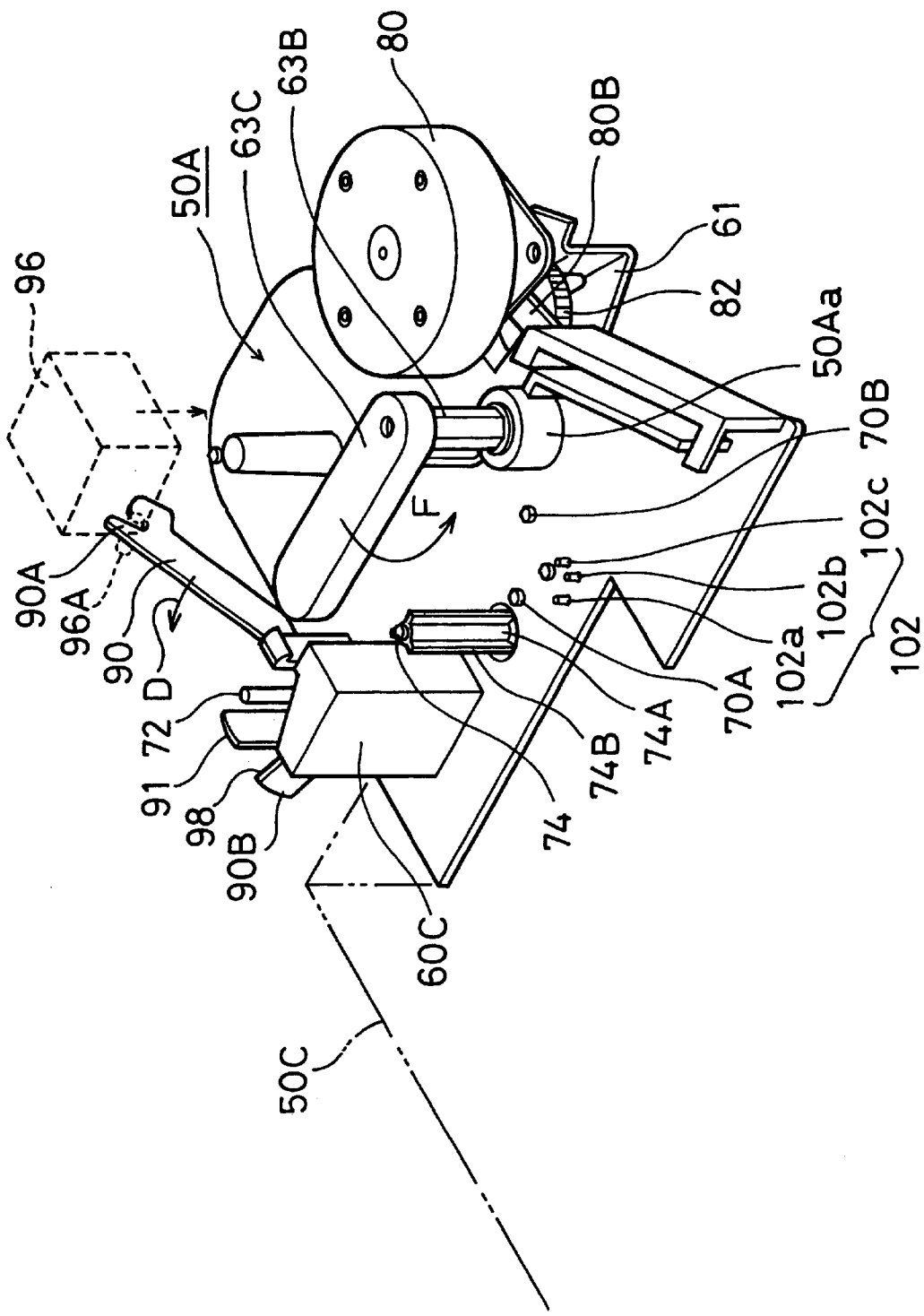
FIG. 4 is a perspective view illustrating a structure of a tape cartridge holder unit 50A.
Figure 5:
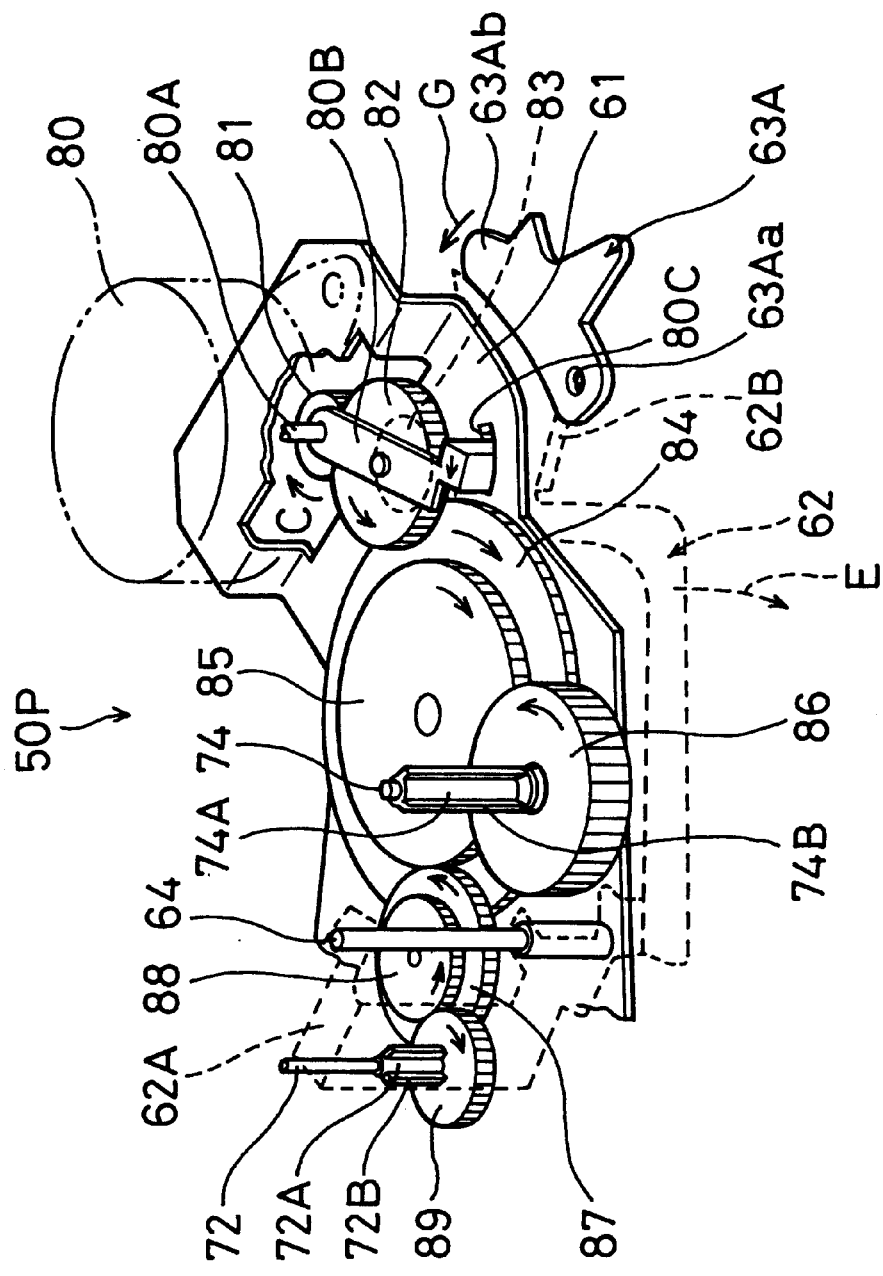
FIG. 5 is a perspective view illustrating a gear train structure and a function of moving a printing head 60 between a printable position and a rest position.

The tape cartridge 10 thus constructed is attached in the tape cartridge holder unit 50A of the tape printing device 1. Mechanical constituents of the tape printing device 1 are described below. FIG. 4 is a perspective view illustrating a typical structure of the tape cartridge holder unit 50A and the peripheral elements, where a cutter button 96 for cutting the printed tape T is shown by the broken line. FIG. 5 is a perspective view illustrating a fundamental structure of a driving mechanism 50P for driving the platen 12 and other elements by means of power of a stepping motor 80 in solid lines as well as a rotational frame 62 rotating around a head-rotating shaft 64 in response to a pivotal operation of the head shift lever 63C in broken lines.

The tape cartridge holder unit 50A is arranged behind the input unit 50C and on the left of the display unit 50D on the tape printing device 1 and defines an attachment space corresponding to the shape of the tape cartridge 10 as shown in FIG. 4. A platen-driving shaft and a ribbon winding core-driving shaft respectively engaging with the hollow members of the platen 12 and the ribbon winding core 24 as well as the printing head 60 are disposed upright in the attachment space of the tape cartridge holder unit 50A. A base board 61 is attached to the lower portion of the tape cartridge holder unit 50A with a screw. A tape cutter 90 (see FIG. 4) and the driving mechanism 50P for transmitting rotations of the stepping motor 80 to the platen 12 and other elements as illustrated in FIG. 5 are mounted on the base board 61. Under the normal conditions, the base board 61 is parted by the housing of the tape cartridge holder unit 50A, so that the driving mechanism 50P is not directly observable by simply opening the cover 50K. FIG. 5 illustrates the driving mechanism 50P with the casing omitted. The rotational frame 62 for moving a head member 65 between a printable position and a rest position in response to operations of the head shift lever 63C is shown by the broken lines in FIG. 5.

The tape cartridge 10 is replaceably attached in the tape cartridge holder unit 50A while the cover 50K is open. When a slide button 52 (see FIG. 1) disposed before the tape cartridge holder unit 50A is slid rightward (in the drawing), engagement of the cover 50K with the main body of the device 1 is released, so that the cover 50K rotates about a cover hinge 54 mounted on a rear portion of the device 1 to be opened.

As described previously, the engagement pieces 18D and 18H formed on the bottom wall 18 of the tape cartridge 10 attached in the tape cartridge holder unit 50A engage with the ink ribbon core 22 and the ribbon winding core 24 so as to prevent unintentional rotations of the ink ribbon core 22 and the ribbon winding core 24. The engagement pieces 18D and 18H are formed respectively by cutting the specific portions of the bottom wall 18 (hatched portions designated as X and Y in FIG. 3). The tape cartridge holder unit 50A has two wedge-like contact projections 70A and 70B disposed at positions substantially in the middle of the hatched portions X and Y as shown in FIG. 4. When the tape cartridge 10 is attached in the tape cartridge holder unit 50A, the contact projections 70A and 70B are respectively fitted in the hatched portions X and Y of the bottom wall 18 of the tape cartridge 10 to press the engagement pieces 18D and 18H in directions away from the ink ribbon core 22 and the ribbon winding core 24. This pressing movement releases the engagement of the engagement pieces 18D and 18H with the ink ribbon core 22 and the ribbon winding core 24, thus allowing rotations of the ink ribbon core 22 and the ribbon winding core 24.

A transmission mechanism for transmitting rotations of the stepping motor 80 to a platen-driving shaft 72 of the platen 12 is described in detail. As shown in FIG. 5, a first gear 81 is attached to a rotational shaft 80A of the stepping motor 80 whereas a clutch arm 80B is fixed to the rotational shaft 80A with a certain friction. A second gear 82 engaging with the first gear 81 and a third gear 83 (shown by the broken line in FIG. 5), which is integrally and concentrically formed with the second gear 82 and disposed below the second gear 82, are attached to the clutch arm 80B. The clutch arm 80B, the second gear 82, the third gear 83, and a largest-diametral fourth gear 84 engaging with the third gear 83 constitute a one-way clutch. When the stepping motor 80 is rotated in a direction shown by the arrow C in FIG. 5, the friction between the rotational shaft 80A and the clutch arm 80B rotates the clutch arm 80B with the second gear 82 and the third gear 83 in the direction of the arrow C to engage with the fourth gear 84. Rotations of the stepping motor 80 are consequently transmitted to the fourth gear 84. Functions of the one-way clutch will be described more in detail below.

The rotation of the fourth gear 84 rotates a fifth gear 85, which is formed concentrically with the fourth gear 84, in the same direction. The rotational force of the fifth gear 85 is then transmitted to a six gear 86 and a seventh gear 87. A rotational shaft of the sixth gear 86 is coupled with a ribbon winding core-driving shaft 74, which winds up the ink ribbon R in response to the rotations of the stepping motor 80. A rim 74A actually driving the ribbon winding core 24 is provided on the ribbon winding core-driving shaft 74 with a certain friction. Under normal operating conditions, the rim 74A rotates integrally with the ribbon winding core-driving shaft 74, which is actuated by the stepping motor 80. When the ribbon winding core 24 is made unrotatable, for example, due to completed winding of the ink ribbon R, on the other hand, the rim 74A slips against the rotation of the ribbon winding core-driving shaft 74.

The rotation of the seventh gear 87 is further transmitted to a ninth gear 89 via an eighth gear 88, which is formed concentrically with the seventh gear 87, thus rotating the platen-driving shaft 72. The platen driving shaft 72 has a rim 72A which engages with an uneven inner face of the platen 12 to actuate the platen 12. Rotations of the stepping motor 80 transmitted to the fourth gear 84 by means of the one-way clutch thus eventually rotate the platen-driving shaft 72 as well as the ribbon winding core-driving shaft 74. As a result, the tape T held between the platen rubber 14 arranged on the circumference of the platen 12 and the head member 65 of the printing head 60 is continuously fed with progress of printing while the ink is ribbon R is wound on the ribbon winding core 24 synchronously with the feeding of the tape T.

The platen-driving shaft 72 has, on an outer surface thereof, three engagement projections 72B which are formed at the equal intervals to engage with engagement grooves formed on the inner surface of the platen 12. The ribbon winding core-driving shaft 74 also has three engagement projections 74B which are formed at the equal intervals on an outer surface thereof to engage with engagement grooves formed on the inner surface of the ribbon winding core 24. When the platen-driving shaft 72 and the ribbon winding core-driving shaft 74 are rotated at a predetermined rate by the stepping motor 80, the tape T and the ink ribbon R are respectively pulled by a predetermined amount out of the tape core 20 and the ink ribbon core 22 to overlap each other and go through a space between the platen rubber 14 and the printing head 60. Specific dot elements on the printing head 60 are heated with the power supplied to the printing head 60 to melt ink of the ink ribbon R corresponding to the heated dot elements. The melted ink is then thermally transferred to the tape T to complete printing on the tape T. After the printing, the tape T with the print thereon is fed from the tape cartridge 10 while the ink ribbon R used for printing is wound on the ribbon winding core 24.

The tape T conveyed with progress of printing is finally discharged from the tape outlet 10A formed in the left side wall of the tape printing device 1. The tape T with the print thereon is normally cut with a cutting mechanism (described later). The user may, however, forcibly pull out the tape T prior to cutting. Under the printable condition on the tape T when the printing head 60 presses the tape T against the platen rubber 14 of the platen 12, the forcible pull-out of the tape T makes the platen-driving shaft 72 rotate. The down-geared platen-driving shaft 72 and a certain amount of retaining torque of the stepping motor 80 prevent rotations of the platen-driving shaft 72 and the ribbon winding core-driving shaft 74 in a conventional driving mechanism. The forcible pull-out of the tape T leads to unintentional pull-out of the ink ribbon R, accordingly. When the tape T is cut with the cutting mechanism under such conditions, the pulled-out portion of the ink ribbon R is also cut undesirably.

In order to solve the above problem, the structure of the embodiment has the one-way clutch including the clutch arm 80B and the second through fourth gears 82 through 84. Upon condition that the user forcibly pulls out the tape T, the platen-driving shaft 72 rotates with the platen 12. The rotation of the platen-driving shaft 72 is transmitted to the fourth gear 84 via the gear train to rotate the fourth gear 84 counterclockwise. The rotation of the fourth gear 84 acts to rotate the third gear 83. However, since the rotational shaft 80A of the stepping motor 80 does not rotate, the rotational force of the fourth gear 84 presses the clutch arm 80B supporting the third gear 83 to release the engagement of the third gear 83 with the fourth gear 84. The release of engagement results in separating the fourth through ninth gears 84 through 89 from the stepping motor 80. The rotation of the platen-driving shaft 72 accompanied with the pull-out movement of the tape T accordingly rotates the ribbon winding core-driving shaft 74. The rotation of the ribbon winding core-driving shaft 74 allows the ink ribbon R to be wound up on the ribbon winding core 24 in response to the pull-out movement of the tape T, thus effectively preventing unintentional pull-out of the ink ribbon R with the tape T. When the stepping motor 80 starts rotating, the clutch arm 80B is shifted again towards the fourth gear 84 to re-engage the third gear 83 with the fourth gear 84. The movement of the clutch arm 80B is defined to a favorable amount by an opening 80C which is formed on the base board 61 and receives the free end of the clutch arm 80B.

The tape T with the print thereon is fed leftward out of the tape cartridge 10 and cut with the cutting mechanism shown in FIG. 4. A cutter-support shaft protruded from the bottom of the tape cartridge holder unit 50A holds a substantially L-shaped, pivotally movable tape cutter 90 and a spring (not shown). The resilient force of the spring keeps the tape cutter 90 under such condition that a counterclockwise rotational force is applied onto the tape cutter 90 as shown by the arrow D in FIG. 4. With this counterclockwise rotational force, a right end 90A of the tape cutter 90 presses the cutter button 96 upward. The right end 90A of the tape cutter 90 is forked to receive a pin 96A formed on a rear face of the cutter button 96. When the cutter button 96 is pressed downward, a left end 90A of the tape cutter 90 shifts downward, accordingly.

The left end 90B of the tape cutter 90 has a movable blade 98 for cutting the tape T, which is arranged at a predetermined angle apart from a fixed blade 91 attached to a side face of the tape cartridge holder unit 50A. A press of the cutter button 96 rotates the tape cutter 90 clockwise in FIG. 4 against the spring force, so that the movable blade 98 and the fixed blade 91 cooperate to cut the tape T. A tape support finger (not shown) moves in response to a press of the cutter button 96 to fix the tape T at a suitable position prior to the cutting of the tape T with the movable blade 98 and the fixed blade 91. A shift of the tape support finger is detected by a detection switch 99 (see FIG. 7), which generates a detection signal to interfere with the printing procedure while the tape T is being cut.

Figure 6:
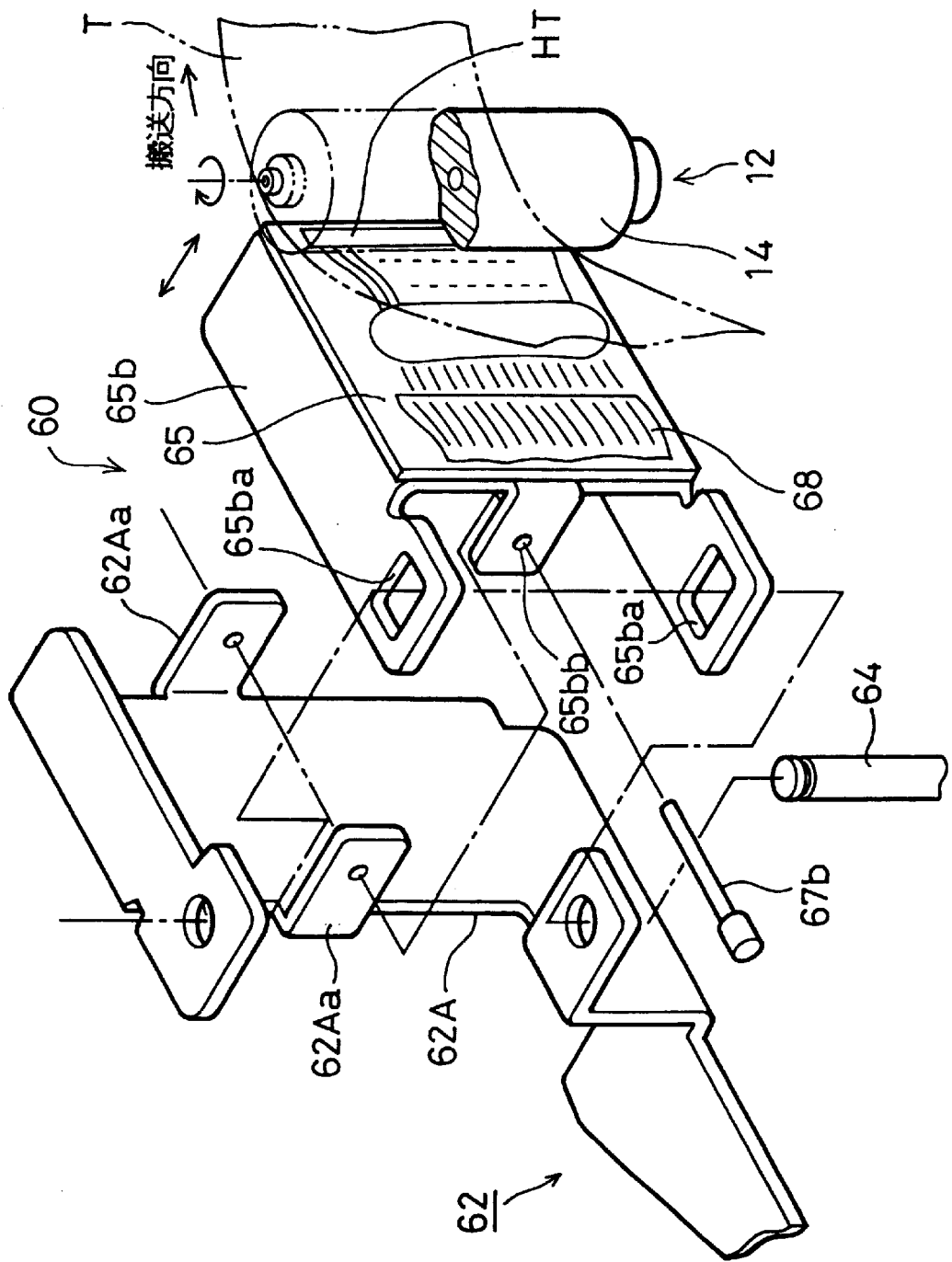
FIG. 6 is a decomposed perspective view showing the printing head 60.

The printing head 60 functioning to print letters and characters on the tape T accommodated in the tape cartridge 10 moves between a printable position and a rest position by a head driving mechanism described below. The printing head 60 is positioned in proximity to the platen-driving shaft 72 at the printable position and apart from the platen-driving shaft 72 at the rest position to allow attachment and detachment of the tape cartridge 10 into and from the tape cartridge holder unit 50A. As illustrated in FIGS. 5 and 6, the printing head 60 has the head member 65, which is attached via a radiator plate 65b to an upright member 62A of the rotational frame 62 rotatably supported on the head-rotating shaft 64 projecting from the base board 61. The rotational frame 62 shown by the broken line in FIG. 5 is pressed strongly in the direction of the dotted arrow E by a spring (not shown) and is stably in contact with a cam member 63A. While the rotational frame 62 is under the stable condition, the upright member 62A of the rotational frame 62, which can pivot about the head-rotating shaft 64, is at the closest position to the platen-driving shaft 72. The printing head 60 attached to the upright member 62A of the rotational frame 62 is accordingly kept at the printable position to start printing characters on the tape T.

A rotational shaft 63Aa of the cam member 63A is coupled with a lower end of a lever rotating shaft 63B, which goes through a cylindrical member 50Aa projecting upright from the tape cartridge holder unit 50A shown in FIG. 4. The head shift lever 63C is integrally formed on the lever rotating shaft 63B. When the operator rotates the head shift lever 63C counterclockwise by 90 degrees as shown by the arrow F in FIG. 4, the cam member 63A is also rotated counterclockwise by 90 degrees as shown by the arrow G in FIG. 5. The rotation of the cam member 63A makes a recess 63Ab of the cam member 63A securely engage with a projection 62B of the rotational frame 62. Under this stable condition, the upright member 62A of the rotational frame 62 is at the farthest position from the platen-driving shaft 72. The printing head 60 attached to the upright member 62A of the rotational frame 62 is accordingly kept at the rest position to allow the tape cartridge 10 to be attached in or detached from the tape cartridge holder unit 50A.

FIG. 6 is a decomposed perspective view showing the detailed structure of the printing head 60 rotating to move between the printable position and the rest position as described above. The printing head 60 of FIG. 6 is drawn from the opposite side to those of FIGS. 4 and 5. As mentioned above, the head member 65 of the printing head 60 is attached via the radiator plate 65b to the upright member 62A of the rotational frame 62, which is rotatably supported on the head-rotating shaft 64 projecting from the base board 61. The head member 65 on which a plurality of heating bodies HT are arranged has a large heating value and is thus fixed to the radiator plate 65b. In order to ensure the smooth rotational movement of the head member 65 attached to the rotational frame 62, a flexible cable 68 having excellent flexibility is used for the electric wiring to the head member 65.

The radiator plate 65b is fixed to the upright member 62A of the rotational frame 62 at two separate positions. At the first fixation point, the head-rotating shaft 64 is fitted in two rectangular apertures 65ba formed in the radiator plate 65b. The rectangular apertures 65ba are formed to orient their shorter sides along the tape-feeding direction. The length of the shorter side is substantially equal to the diameter of the head-rotating shaft 64 whereas that of the longer side is approximately twice the diameter of the head-rotating shaft 64. At the second fixation point, a pin 67b is fitted in apertures 62A*a* of the rotational frame 62 and an aperture 65*bb* of the radiator plate 65*b*, which are formed perpendicular to the head-rotating shaft 64. The radiator plate 65*b* is positioned accurately by the shorter sides of the rectangular apertures 65*ba* in the tape-feeding direction while being arranged rotatably about the longer sides of the rectangular apertures 65*ba* and the pin 67*b* in the direction of the tape width. This structure allows the head member 65 to be precisely kept at the printable position opposite to the platen 12, upon condition that the printing head 60 is pressed towards the platen 12, Even when the tape T held between the printing head 60 and the platen 12 is slightly inclined in the direction of the tape width, the pivotal movement of the radiator plate 65*b* about the pin 67*b* allows the heating bodies HT to uniformly press the tape T against the platen 12.

Figure 7:
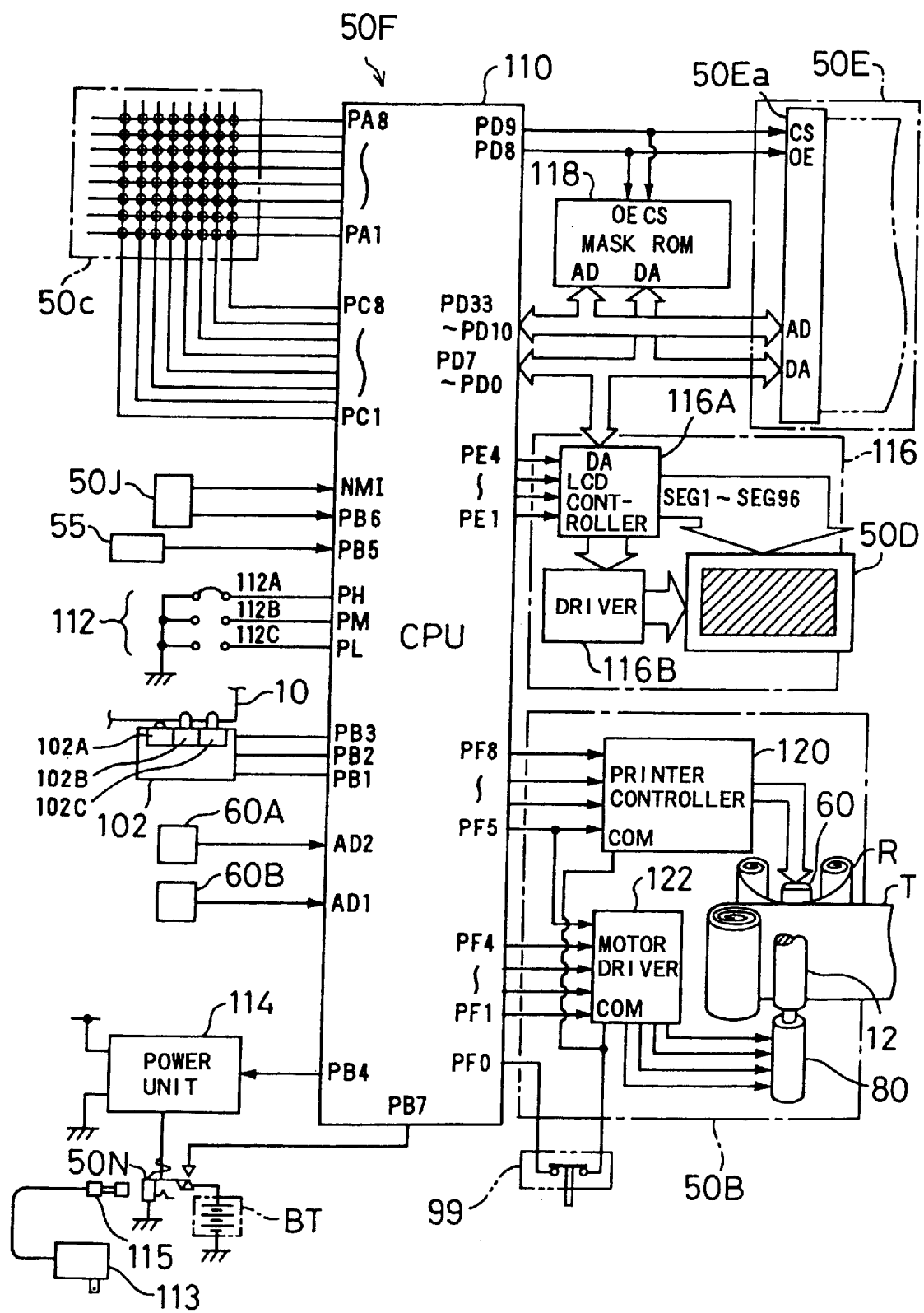
FIG. 7 is a block diagram showing an electric structure including a CPU 110.

Detailed structure of the input unit 50C, the display unit 50D, and the printer unit 50B incorporated in the tape printing device 1 is described below after the brief explanation of electric structure of the various units including a control circuit unit 50F. The control circuit unit 50F constituted as a printed circuit board is installed with the printer unit 50B immediately below the cover 50K. FIG. 7 is a block diagram schematically showing electric structure of various units in general. The control circuit unit 50F of the tape printing device 1 includes a one-chip microcomputer 110 (hereinafter referred to as CPU) having a ROM, a RAM, and input-output ports integrally incorporated therein, a mask ROM 118, and a variety of circuits functioning as interfaces between the CPU 110 and the input unit 50C, the display unit 50D, and the printer unit 50B. The CPU 110 connects with the input unit 50C, the display unit 50D, and the printer unit 50B directly or via the interface circuits to control these units.

Figure 8:
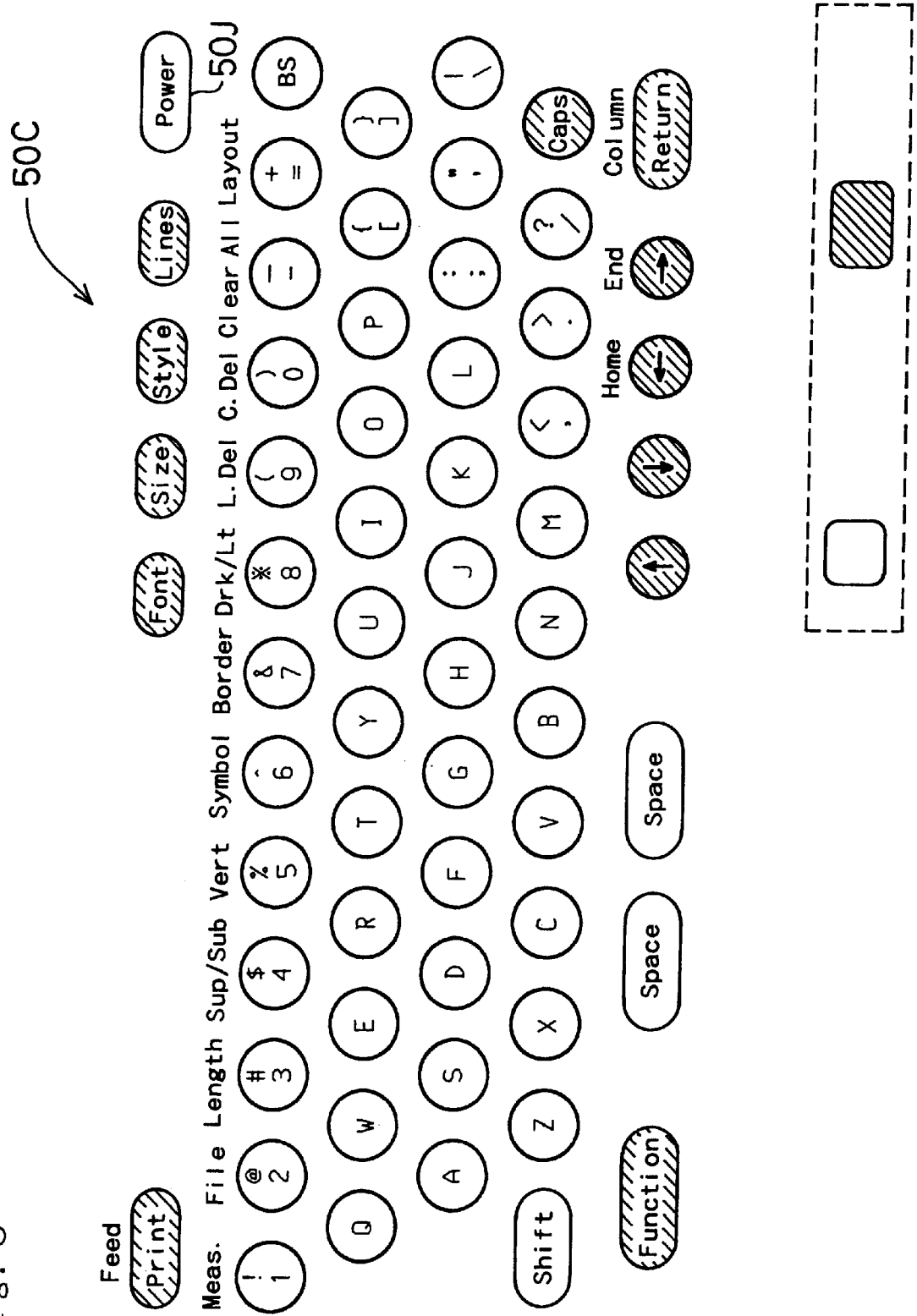
FIG. 8 shows an exemplified arrangement of keys on an input unit 50C.

The input unit 50C has forty-eight character keys and fourteen function keys, sixty-two keys in total, as shown in FIG. 8. The character keys have a so-called full-key arrangement according to a QWERTY arrangement. Like word processors, the input unit 50C has a commonly known shift key to avoid an undesirable increase in the number of keys. The function keys enhance the ability of the tape printing device 1 by realizing quick execution of various functions such as character input, editing, and printing.

These character keys and the function keys are allocated to an 8×8 matrix. As shown in FIG. 7, sixteen input ports PA1 through PA8 and PC1 through PC8 of the CPU 110 are divided into groups, and the sixty-one keys of the input unit 50C are arranged at the respective intersections of the input ports. The key arrangement is shown in FIG. 8. The power switch button 50J is disposed independently of the matrix keys and connects with a non-maskable interrupt NMI of the CPU 110. When the power switch button 50J is pressed, the CPU 110 starts non-maskable interruption to supply or shut off the power.

An output from the detection switch 55 for detecting opening and closing operations of the cover 50K is input into a port PB5, so that the CPU 110 interrupts to monitor the opening and closing conditions of the cover 50K. When the detection switch 55 detects an opening operation of the cover 50K while the printing head 60 is driven to work, the CPU 110 displays a predetermined error command on a main display element 50D*a* (see FIG. 9) of the display unit 50D and cuts the power supply to the printer unit 50B.

Ports PH, PM, and PL of the CPU 110 are connected to a head rank detection element 112. The resistance of the printing head 60 significantly varies according to the manufacturing process. The head rank detection element 112 measures the resistance of the printing head 60 to determine the rank of the printing head 60 and set three jumper elements 112A, 112B, and 112C of the head rank detection element 112 based on the measurement results. The CPU 110 then reads the condition of the head rank detection element 112 to correct a driving time or heating amount of the printing head 60, thus effectively preventing the density of printing from being varied undesirably.

The printer unit 50B implements printing by the known thermal transfer process, where the density of printing varies with the air temperature and the driving voltage as well as the power-supply time of the thermal printing head 60. A temperature detection circuit 60A and a voltage detection circuit 60B respectively detect the temperature and the driving voltage. These circuits 60A and 60B are integrally incorporated in the printing head 60 and output detection signals to two-channel analog-to-digital conversion input ports AD1 and AD2 of the CPU 110. The CPU 110 reads voltages input and converted to digital signals through the input ports AD1 and AD2 to correct the power-supply time of the printing head 60.

A discriminating switch 102 disposed on a right lower corner of the tape cartridge holder unit 50A (see FIG. 4) is connected to ports PB1 through PB3 of the CPU 110. The discriminating switch 102 includes three cartridge discriminating switch elements 102A, 102B, and 102C respectively inserted into the three detection holes 18K*a*, 18K*b*, and 18K*c* formed in the tape cartridge 10. Projections of the cartridge discriminating switch elements 102A, 102B, and 102C are determined to correspond to the depths of the detection holes 18K formed in the bottom wall 18 of the tape cartridge 10. When a cartridge discriminating switch element 102 is inserted in a shallow detection hole 18K, the cartridge discriminating switch element 102 is in contact with and pressed by the detection hole 18K to be at ON position. When a cartridge discriminating switch element 102 is inserted in a deep detection hole 18K, on the other hand, the cartridge discriminating switch element 102 is loosely fitted in the detection hole 18K to be at OFF position. The CPU 110 determines the type of the tape cartridge 10 set in the tape cartridge holder unit 50A, that is, the width of the tape T accommodated in the tape cartridge 10, based on the conditions of the three cartridge discriminating switch elements 102A, 102B, and 102C of the discriminating switch 102. Tape width information representing the width of the tape T is used to determine the character size and font as well as control the printer unit 50B as described later.

A port PB7 of the CPU 110 receives signals transmitted from a contact of the jack 50N. When a plug 115 is inserted into the jack 50N to supply direct current through an AC power cord 113 into the jack 50N, power supply from a battery BT to a power unit 114 is cut by means of a break contact of the jack 50N in order to avoid unnecessary power consumption of the battery BT. At the same time, signals output from the contact of the jack 50N are input into the port PB7 of the CPU 110. The CPU 110 reads the signals to determine whether the main power supplied to the tape printing device 1 is from the AC power cord 113 or the battery BT and subsequently executes the controls according to the requirements. In the embodiment, upon condition that the power is supplied from the AC power cord 113, the printing speed of the printer unit 50B is set at the maximum. When the power is supplied from the battery BT, on the other hand, the printing speed of the printer unit 50B is slowed down to lower the peak of electric current supplied to the printing head 60 and save the power of the battery BT.

The eight mega-bit mask ROM 118 connected to an address bus and a data bus of the CPU 110 stores three different fonts of 16×16 dots, 24×24 dots, and 32×32 dots. The mask ROM 118 stores alphabetical types, such as elite, pica, and courier as well as Chinese characters and other specific characters and symbols according to the requirements. A 24-bit address bus AD, an 8-bit data bus DA, a chip selecting signal CS, an output enable signal OE of the mask ROM 118 are connected with ports PD0 through PD33 of the CPU 110. These signals are also input into an external input-output connector 50E$a$ to allow an extension unit 50E attached to the external input-output connector 50E$a$ to be accessible in a similar manner to the mask ROM 118.

The extension unit 50E directly connectable with the control circuit unit 50F receives a ROM pack or RAM pack optionally supplied as an external memory element. The control circuit unit 50F is electrically connected with the external input-output connector 50E$a$ through insertion of the ROM pack or RAM pack into a slot of the extension unit 50E, so that information is transmittable between the CPU 110 and the ROM pack or RAM pack. The ROM pack inserted in the extension unit 50E may store specific characters, marks, and symbols for drawings, maps, chemistry, and mathematics as well as linguistic fonts other than English or Japanese, and character fonts such as Gothic, Ming, and block type faces. This structure allows the user to edit text data in a desirable font. The battery-backed RAM pack in which information is freely written may alternatively be inserted in the extension unit 50E. The RAM pack stores a greater amount of information than the storage capacity of an internal RAM area of the tape printing device 1 to create a library of text data or to be used for information exchange with another tape printing device 1.

Character dot data read out of the mask ROM 118 or the extension unit 50E are input into an LCD controller 116A of a display control circuit 116 as well as the CPU 110.

Figure 9:
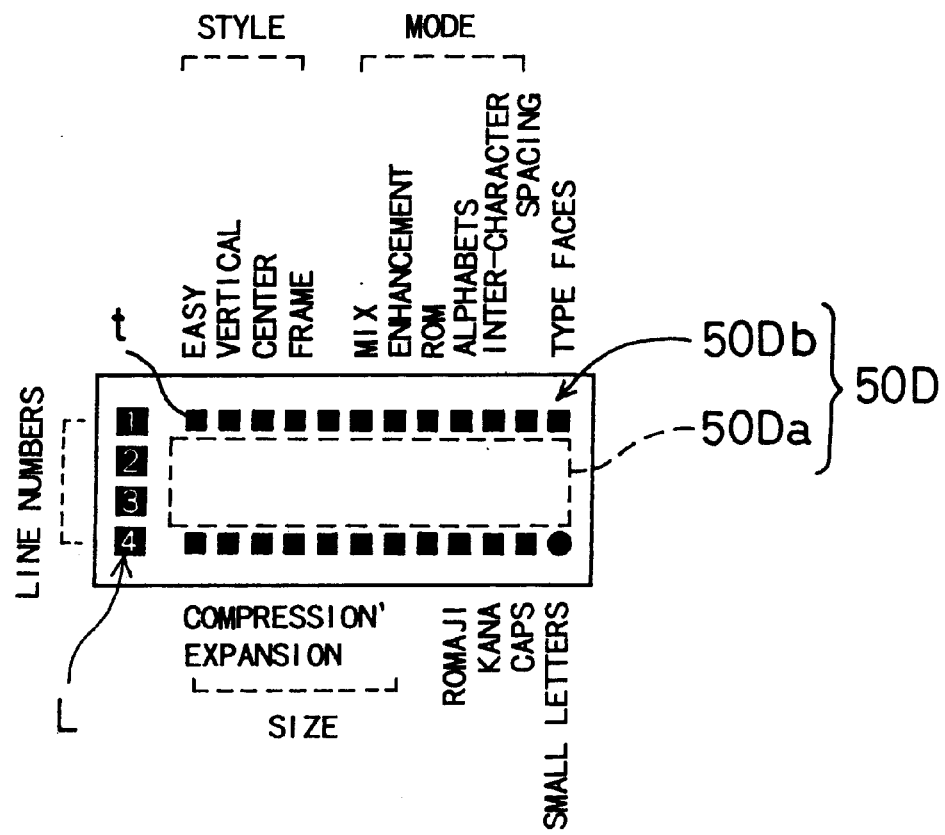
FIG. 9 shows a typical structure of a display unit 50D.

The display unit 50D controlled by the CPU 110 via the display control circuit 116 is laid under a transparent portion of the cover 50K. The user can thus see the display unit 50D through the cover 50K. The display unit 50D has two different electrode patterns on a liquid-crystal panel; that is, a dot matrix pattern and twenty-eight square and circular electrode patterns arranged to surround the dot matrix pattern as shown in FIG. 9. The area of the dot matrix pattern is designated as a main display element 50D$a$ for displaying a print image whereas the area of the square and circular electrode patterns is referred to as an indicator element 50D$b$.

The main display element 50D$a$ is a liquid crystal display panel allowing a display of 16 dots in height by 96 dots in width. In the embodiment, since a character font of 16 dots in height by 16 dots in width is used for data input and editing, a display on the main display element 50D$a$ includes six characters by one line. Each letter or character is shown as a positive display, a negative display, or a flash display in the progress of the editing procedure. This allows the user to visually follow the progress of processing with the tape printing device 1. Although the 16×16 character font is preferable for clearly displaying each character data, another font having the lower resolution, for example, 5×7 character font, may be applied to increase the number of character data which can be displayed on the main display element 50D$a$.

The display on the main display element 50D$a$ is in the dot matrix pattern and controlled arbitrarily. For example, a layout of current print image may be displayed by a press of a 'Function' key on the input unit 50C shown in FIG. 8. The layout display is automatically scrolled from the right side to the left side of the main display element 50D$a$. This allows the user to check the whole layout of text data.

The indicator element 50D$b$ surrounding the main display element 50D$a$ includes a variety of indicators 't' representing various functions. Some of the indicators 't' corresponding to the functions currently executed by the tape printing device 1 are ON to emit light. The respective functions of the indicators 't' corresponding to the square and circular electrode patterns on the indicator element 50D$b$ are printed around the electrode patterns of the display unit 50D. Available functions include: selection of a character input mode, such as 'Capital Letter' or 'Small Letter'; specification of a printing and editing style, such as 'Vertical Print' or 'Center Line'; and specification of a print format, such as 'Justification' or 'Left Weight'. When a certain function is selected or specified, an indicator 't' corresponding to the function is turned ON to emit light. For example, when the 'Center Line' function is set, the indicator 't' corresponding to the 'Center Line' lights up. The function 'EASY' in the printing and editing style represents automatic specification of a style preset in the tape printing device 1.

The function 'Line Number' on the indicator element 50D$b$ has four indicators 'L' to which digits '1' through '4' are assigned as illustrated in FIG. 9. While the main display element 50D$a$ has the capacity of displaying only one line of text data, the tape printing device 1 can print the maximum of four lines on the tape T. The 'Line Number' indicators 'L' corresponding to the existing lines of text data are ON to emit light. The procedure of line number display will be described later more in detail.

The printer unit 50B of the tape printing device 1 includes the printing head 60 and the stepping motor 80 as mechanical constituents, and a printer controller 120 and a motor driver 122 for controlling the mechanical constituents as electrical constituents. The printing head 60 is a thermal head having sixty-four heating points arranged in one column at a pitch of $\frac{1}{180}$ inch, and internally provided with the temperature detection circuit 60A for detecting the air temperature and the voltage detection circuit 60B for detecting the supply voltage as described previously. The stepping motor 80 has a known structure for controlling the phase of four-phase driving signals to adjust the rotational angle. A tape feeding distance corresponding to each step of the stepping motor 80 is set equal to $\frac{1}{360}$ inch by the gear train functioning as a reduction gear mechanism. The stepping motor 80 receives a two-step rotation signal output synchronously with printing of each dot executed by the printing head 60. The printer unit 50B thereby executes printing in a printing pitch of 180 dots/inch both in the longitudinal direction of the tape T and the direction of the tape width.

The detection switch 99 for detecting the operation of the cutting mechanism is inserted in a common line for connecting the printer controller 120 and the motor driver 122 to the CPU 110 as shown in FIG. 7. When the cutting mechanism is activated during execution of the printing, the detection switch 99 works to inactivate the printer unit 50B without delay. Since signals are continuously transmitted from the CPU 110 to the printer controller 120 and the motor driver 122, the printing procedure is resumed after interruption of the cutting procedure with the cutting mechanism.

The power unit 114 incorporated in the tape printing device 1 receives a stable back-up or logic circuit 5V power from the battery BT by an RCC method using an IC and a transformer. The CPU 110 has a port PB4 allocated to the voltage regulation.

The internal ROM of the CPU 110 stores a variety of programs for controlling the peripheral circuits. The internal RAM of the CPU 110 includes a first part designated as a system's area used for execution of the variety of programs stored in the internal ROM and a second part defined as a user's area including a text area for editing of text data and a file area for storing contents of the text data.

The text area has the capacity of 125 character data of fixed input and stores character codes as well as style data and mode data used for editing the text data. The data in the text area may be supplemented or updated by the data input and editing procedures through the input unit 50C. The text area on the internal RAM of the CPU 110 may be referred to as a text data buffer.

The internal RAM has a file area of 1,500-character capacity while an optionally supplied RAM pack has a file area of 2,000-character capacity. The file area may store and manage 1 through 99 variable-length files according to a file management program stored in the internal ROM. The file management program also provides basic operation environments including registration, load, copy, and delete of a specified file.

Figure 10:
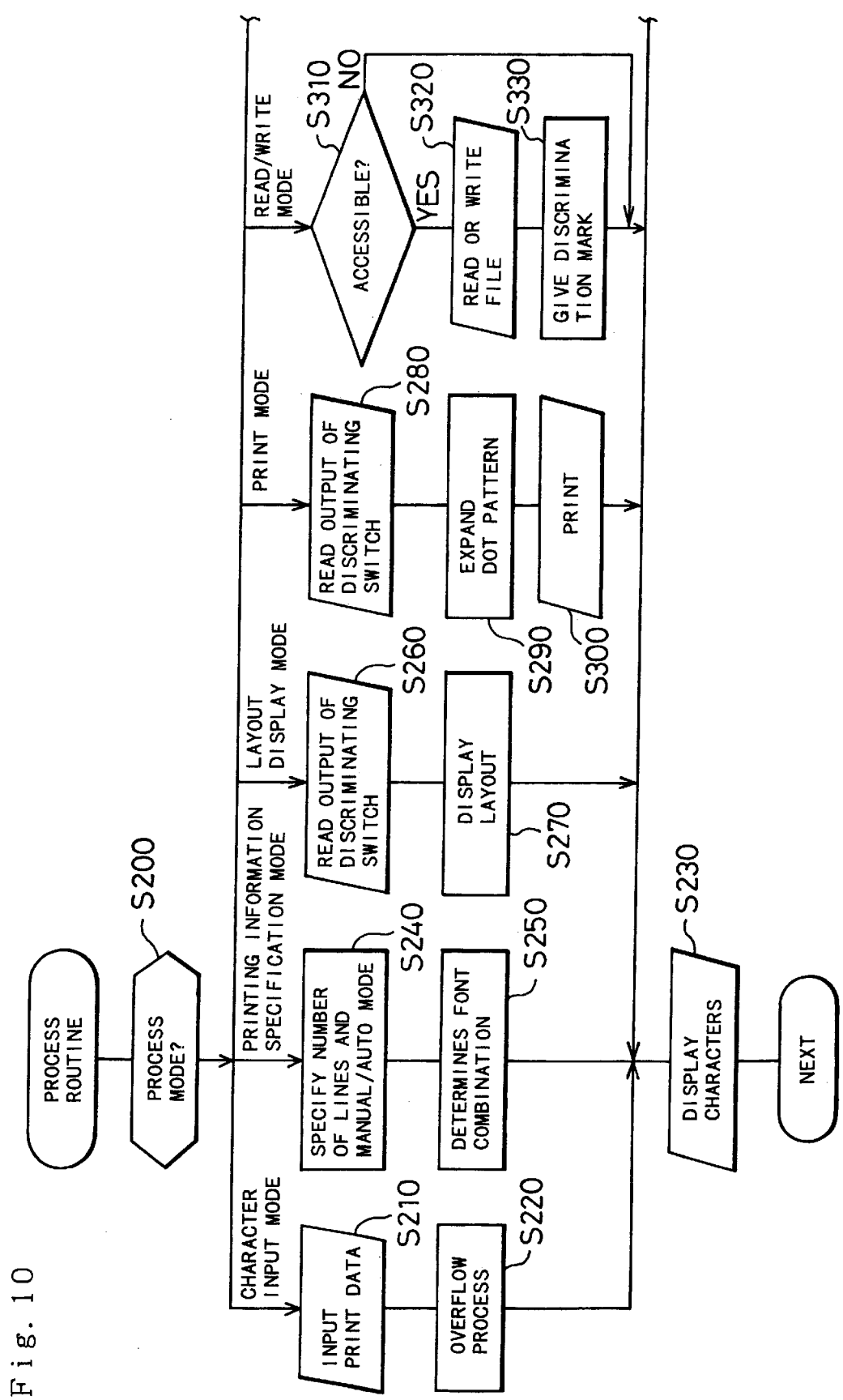
FIG. 10 is a flowchart showing a process routine executed by the tape printing device 1.

A general process routine executed by the CPU 110 of the tape printing device 1 of the embodiment is described according to the flowchart of FIG. 10. The tape printing device 1 has a variety of process modes including a character input mode, a printing information specification mode, and a layout display mode. The tape printing device 1 is set in one of the process modes in response to a press of a corresponding function key on the input unit 50C. When no function keys are operated but a character key is pressed, character data corresponding to the character key is input.

When the program enters the process routine of FIG. 10, the process mode is identified first at step S200. When the process mode is not specified, the tape printing device 1 is determined to be in the character input mode and waits for input of character data at step S210. Character data corresponding to alphabets and numerals input from the input unit 50C are directly transferred to a text data buffer whereas those corresponding to 'kana' (Japanese alphabets) are sent to the text data buffer after a required conversion of some 'kana' to 'kanji' (Chinese characters).

Character data newly input from the input unit 50C are added to the end of text data stored in the text data buffer is in general procedures, or may be inserted into any desirable position of the existing text data with the aid of cursor positioning. Alternatively, the newly input character data may be over-written to replace the existing text data.

The text data buffer has the capacity of 125 character data. When text data over the 125-character capacity are input from the input unit 50C, the CPU 110 executes an overflow process at step S220. In the case of 'kana' input, the overflow process is executed after conversion to 'kanji'. The overflow process eliminates character data exceeding the 125-character limit from the end of text data stored in the text data buffer in either case when input character data are added to the end of the text data or when input character data are inserted at a desirable position of the text data.

After the overflow process at step S220, the program goes to step S230 at which text data finally settled are displayed on the display unit 50D. As described previously, text data of up to four lines can be printed on the tape T whereas the display unit 50D has the capacity of displaying only six character data by one line. In this embodiment, each character data input at step S210 is managed as 16-bit information. Printing information representing a line number and other attribute data also occupies one-character space (=16 bits) in the text data buffer. The 16-bit printing information consists of a flag for identifying a line number (2 bits), data representing the total number of lines (2 bits is sufficient for the maximum of four lines), face data (3 bits for 7 faces), font data (5 bits) including distinction between an internal font and an external fonts, and line spacing and inter-character spacing data (4 bits).

Figure 11:
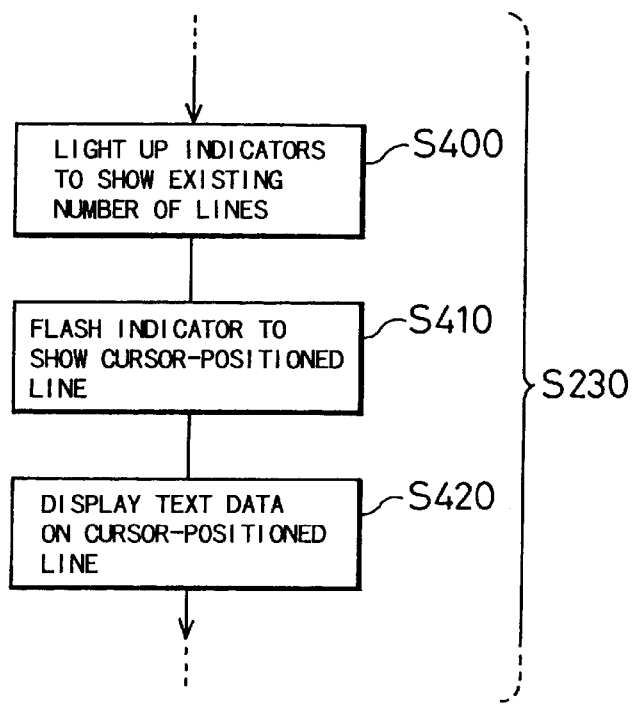
FIG. 11 is a flowchart showing detailed steps of the data displaying process of FIG. 10.

The process of displaying text data stored in the text data buffer at step S230 consists of several steps shown in the flowchart of FIG. 11. At step S400, the 'Line Number' indicators 'L' on the indicator element 50Db corresponding to the existing lines of text data are turned ON to emit light. One of the 'Line Number' indicators 'L' corresponding to a line where the cursor is currently positioned is then shown by flashing at step S410. The program subsequently goes to step S420 at which text data of the cursor-positioned line are then displayed on the main display element 50Da as the dot matrix pattern.

The lighting and flashing process of the 'Line Number' indicators on the indicator element 50Db allows the user to check the total number of existing lines of text data to be edited and the position of the cursor. FIGS. 12A and 12B show examples of the lighting and flashing process of the 'Line Number' indicators executed at steps S400 and S410. When three lines of text data are edited for printing as shown in FIG. 12A, the liquid-crystal 'Line Number' indicators 'L' having the digits '1', '2', and '3' are turned ON to emit light. The 'Line Number' indicator 'L' having the digit '2' flashes to show that the cursor is positioned on the second line and that text data of the second line is currently displayed on the main display element 50Da. The term 'flash' means switching ON and OFF at predetermined short intervals. In the example of FIG. 12B, four lines of text data are edited for printing and the cursor is positioned on the first line. All the 'Line Number' indicators 'L' having the digits '1' through '4' are turned ON to emit light whereas the 'Line Number' indicator 'L' having the digit '1' flashes, accordingly. After the text data display process at step S230, the program goes to 'NEXT' and exits from the routine.

The printing information specification mode may be set for each paragraph. The term 'paragraph' denotes each block of text data divided along the length of the tape T. In one example, text data printed on the tape T to represent a title applied onto the spine of a video tape include a first paragraph for picture data or icon of one line, a second paragraph for character data of one line representing the name of the film, and a third paragraph for character data of two lines representing the names of the director and leading actors and actresses.

When the printing information specification mode is selected at step S200, the program goes to step S240 at which required printing information is specified and either 'AUTO' mode or 'MANUAL' mode is selected for plural-line printing. The required printing information includes a total number of lines printed on the tape T, enhancement data (for example, bold, italics, underlined, outline type, and highlighted), inter-character spacing data (narrow, standard, wide), line spacing data (narrow, standard, wide), and font data for distinguishing between an internal font and an external ROM font. Each printing information is specified by selecting a desirable one out of a plurality of choices previously prepared. For example, the total number of lines to be printed is selected from the choices '1', '2', '3', and '4' since text data of up to four lines can be printed on the tape T in the embodiment. For plural-line printing, either the 'AUTO' mode or the 'MANUAL' mode is selected. The plurality of choices are successively highlighted on the display unit 50D through operation of the cursor keys and space bars on the input unit 50C. The user presses the 'Return' key on the input unit 50C to settle each printing information selected. In this embodiment, 'style' information represents information applied to the whole paragraph, such as the total number of lines to be printed and selection of horizontal or vertical print, whereas 'mode' information denotes the other specified information, such as inter-character spacing data.

When plural-line printing is specified, the program goes to step S250 at which a desirable font combination is determined. The tape printing device 1 of the embodiment has three different font data of 16×16 dots, 24×24 dots, and 32×32 dots as basic fonts stored in the mask ROM 118. The non-overlapped dots in each font are expandable by two times both in height and width. There are accordingly seven possible combinations of printable dot numbers or fonts including the maximum font of 64×64 dots. When text data are edited and printed in a plurality of lines, specification of the font applied to the text data on each line is required in addition to input of character data printed on the line. The seven printable dot number combinations correspond to 'Compress', 'Expand', 'P', 'S', 'M', 'L', and 'G' with the indicators 't' on the indicator element 50D$b$ as shown in FIG. 9. The indicator 't' corresponding to the selected printable dot number combination lights up to inform the user.

The process executed at steps S240 and S250 in the printing information specification mode specifies fundamental information significantly affecting the results of printing on the tape T. The user is hence required to specify the printing information and the font while roughly estimating the results of printing. The tape printing device 1 of the embodiment further executes the processing described below in order to simplify the operations in the printing information specification mode and improve the printing quality.

Figure 13:
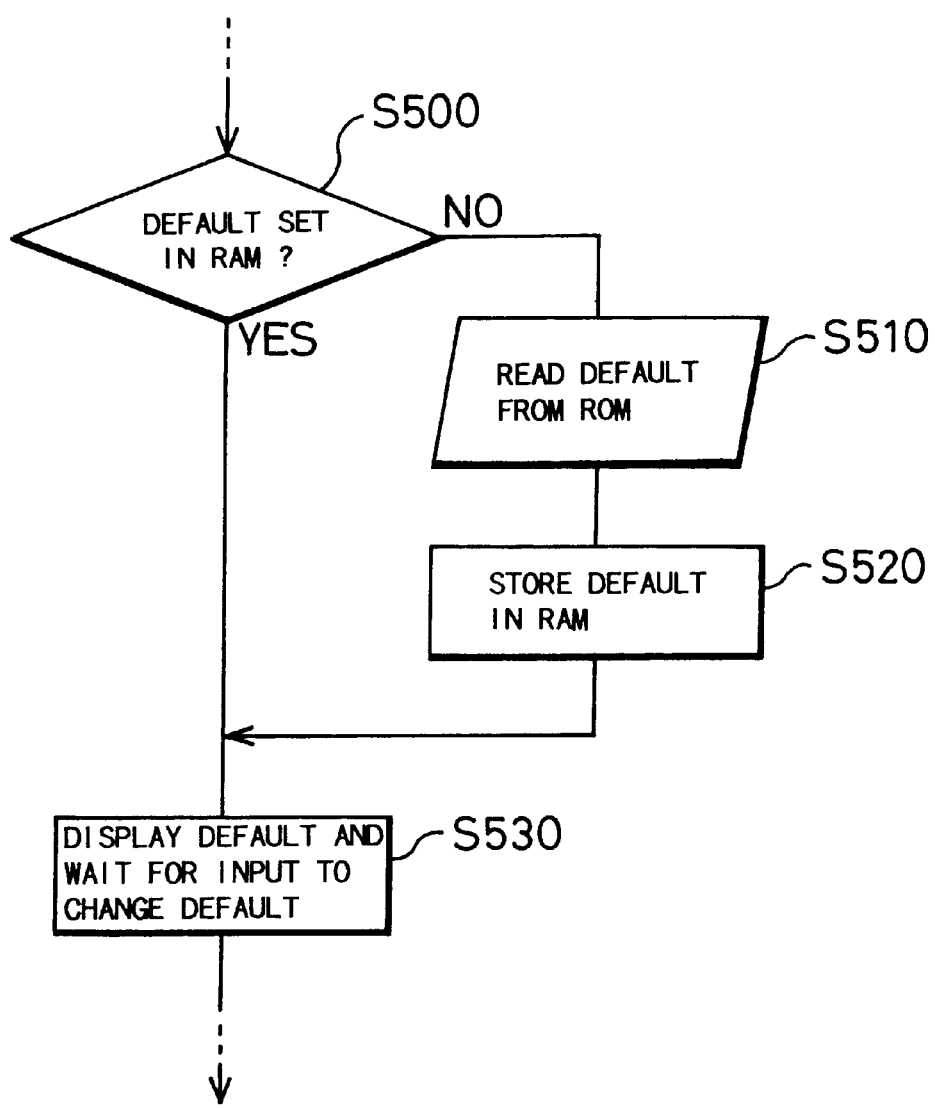
FIG. 13 is a flowchart showing detailed steps of a part of the processing in the printing information specification mode.

FIG. 13 is a flowchart showing the process of specifying 'style' information applied to the whole paragraph with a default. The 'style' information specified here is selection of either 'Vertical Print' or 'Horizontal Print'. For selection of either 'Vertical Print' or 'Horizontal Print', it is first determined whether a default has already been set in a specific area of the RAM at step S500. Upon condition that power supply to the tape printing device 1 has just started and no default has been set in the RAM, a default stored in the ROM as non-volatile data, in this embodiment, selection of 'Horizontal Print', is read from the ROM at step S510. The default is then stored in the specific area of the RAM at step S520.

When it is determined that the default has already been set in the RAM at step S500 or after the processing of step S520 is completed, the program proceeds to step S530 at which the default is displayed on the main display element 50D$a$ of the display unit 50D. During the display, the user may change the default according to the requirements.

The default of the 'style' information once set in the specific area of the RAM is applied to the subsequent paragraphs unless the user intentionally inputs data to change the default. This prevents the different writing styles, 'Vertical Print' and 'Horizontal Print' from being mixed up unintentionally on the tape T. Although the user can arbitrarily change the 'style' of printing text data on the tape T, confusing arrangement of 'Vertical Print' and 'Horizontal Print' is generally not preferred.

Figure 14:
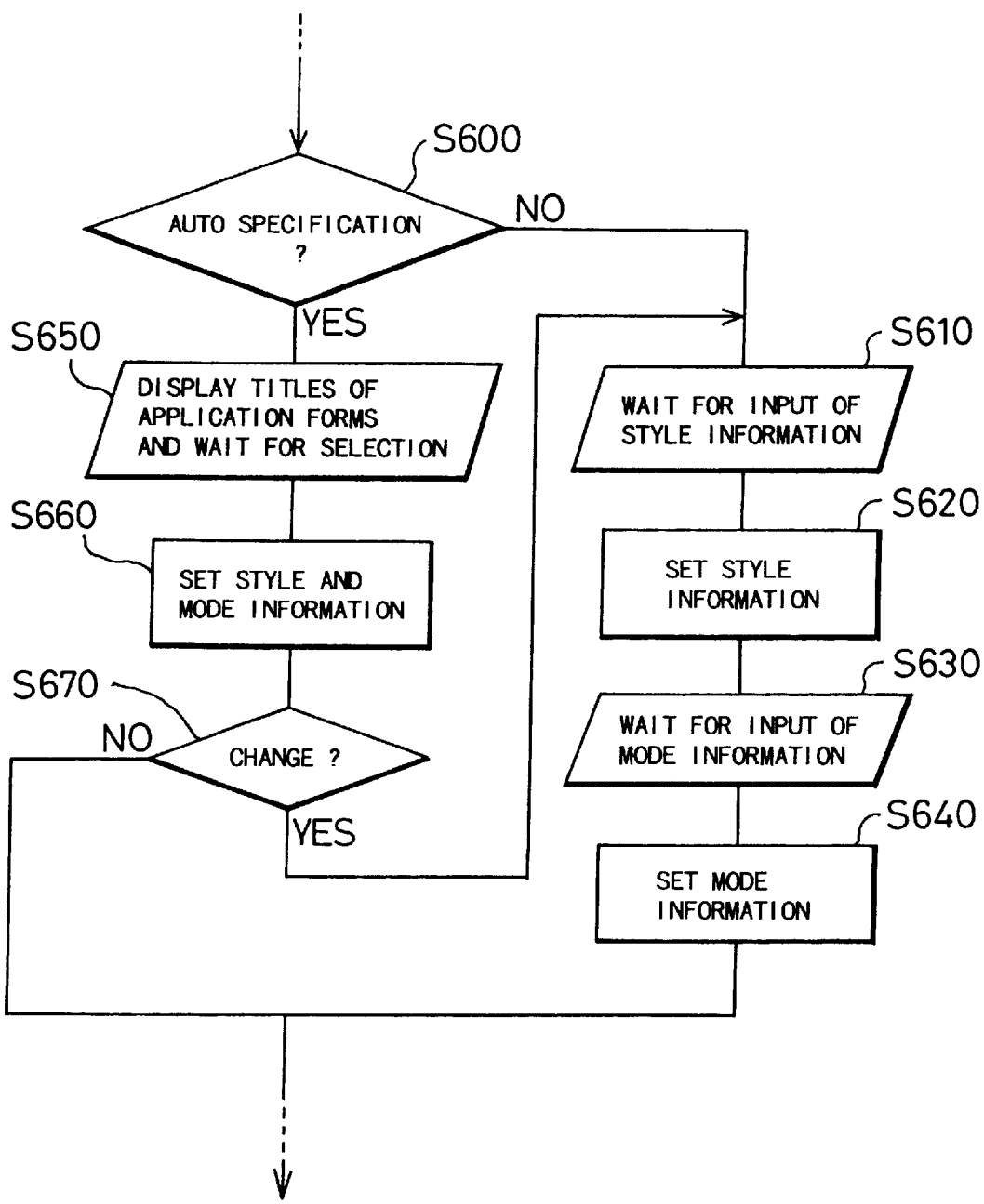
FIG. 14 is a flowchart showing detailed steps of another part of the processing in the printing information specification mode.
Figures 15A, 15B:
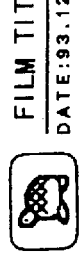
Figures 18A, 18B:
Figure 20A:
Figure 20B:

Other than the default used for the simplified specification of the 'style' information, the tape printing device 1 of the embodiment has a plurality of defaults called application forms where all the 'style' information and the 'mode' information have been set in advance. The user can specify the 'style' information including the total number of lines to be printed and selection of 'Vertical Print' or 'Horizontal Print' as well as the 'mode' information including inter-character spacing data and fancy type data by simply selecting a desired default among the plurality of application forms. FIG. 14 is a flowchart showing a routine of selecting a desired application form, which is executed at a start of the printing information specification mode. At step S600, it is determined whether the 'style' information and 'mode' information are specified automatically or manually, based on operation of a specific key on the input unit 50C. When the manual specification is selected, the program enters the 'Manual' mode where the processing of steps S240 and S250 are successively executed. The tape printing device 1 waits for an input of the 'style' information by the user at step S610 and sets the 'style' information according to the input at step S620. In a similar manner, the tape printing device 1 waits for an input of the 'mode' information by the user at step S630 and sets the 'mode' information according to the input at step S640. The program then exits from the routine.

When the easy specification is selected at step S600, the program enters the 'EASY' mode. At step S650, the tape printing device 1 displays titles of application forms having specified defaults on the display unit 50D and waits for selection of a desired application form out of the plural choices. There are eight application forms preset in the embodiment, which have the titles of 'VHS: Horizontal', 'VHS: Vertical', 'VHS-C', '8 mm Video', 'Cassette Tape', 'Name & Address', 'Name Plate', and 'Identification Tag' ('VHS', 'VHS-C', and '8 mm Video' are trade names). FIGS. 15A through 22A show the titles and the specified defaults of 'style' information and 'mode' information whereas FIGS. 15B through 22B show examples of printing based on the defaults. These application forms give only eight combinations of the 'style' and 'mode' defaults, and the user can arbitrarily change the defaults specified by the selected application form as described later. As shown in FIGS. 15A through 22A, each application form only suggests a position suitable for picture data or icon, a position suitable for standard character data, and a position suitable for data of the date and time by specific display on the display unit 50D. The tape printing device 1 accepts an input of text data in an arbitrary form different from the suggestion other than an input of text data in the suggested form.

After the user selects a desired title of application form at step S650, the program goes to step S660 at which the 'style' and 'mode' defaults are set corresponding to the selected application form. At step S670, it is determined whether modification of the defaults is required. When any modification is required, the program goes to step S610 to change the defaults. When no modification is required, on the contrary, the program exits from the routine.

When the layout display mode is selected at step S200, the program goes to step S260 at which the CPU 116 reads an output of the cartridge discriminating switch 102, which represents the type of tape cartridge 10 set in the tape printing device 1, and more specifically, the printable width of the tape T. After the identification of the tape width, the program goes to step S270 to display text data in a specific layout corresponding to the specified printing information and font combination. When a tape cartridge 10 having the tape T of appropriate width is set in the tape printing device 1, text data are shown in white against the tape T shown in black on the main display element 50D$a$. Upon condition that no tape T is set in the tape printing device 1, text data (with a frame line according to the requirements) are shown in black while the tape T is not displayed at all. This inverted display of text data distinctively informs the user of no setting of the tape T.

When the width of the tape T is insufficient for the selected 'style' and 'mode' information, a portion out of the tape width is highlighted. An acoustic or visual alarm may also inform the user of non-tape setting or inappropriate tape setting. After the layout display process at step S270, the program goes to step S230 to resume the display of text data on the display unit 50D.

When a print mode is selected at step S200, the program goes to step S280 at which the CPU 110 reads detection signals output from the cartridge discriminating switch 102. At step S290, the CPU 110 determines the width of the tape T set in the tape printing device 1 based on the detection signals from the cartridge discriminating switch 102, and expands a dot pattern of each line according to the tape width and the relative character size of each line by referring to a font map previously stored in the internal ROM.

The dot pattern expansion process of step S290 includes specifying a suitable font used for printing each line, successively reading character codes of the specified font corresponding to the text data from mask ROM 118, and expanding each character code to a dot pattern. After completing the dot pattern expansion at step S290, the program goes to step S300 to execute printing. In concrete procedures, the CPU 110 prepares 64-bit serial data by extracting the dot pattern by every column, and transfers the serial data to the printer unit 50B.

Text data stored in the text data buffer are then printed in either 'Auto' mode or 'Manual' mode. In 'Manual' mode, text data stored in the test data buffer are printed according to the number of lines previously specified. After plural-line printing, for example, two-line printing, is specified and text data are input for two lines, text data on the second line may be eliminated according to the requirements. On condition that the user eliminates text data for the second line, text data for only the first line should be printed. In 'Auto' mode, when no text data exists on the second line, text data of only the first line are expanded to dot patterns and printed with a large font. When text data exist on both the first and the second lines, on the other hand, a smaller font is selected for printing text data of the two lines. In 'Manual' mode, even when no text data exists on the second line, text data of the first line is printed with a font selected for the two-line printing. This printing procedure is applied to any plural-line printing such as three-line printing or four-line printing as well as two-line printing described above.

In the tape printing device 1 of the embodiment, text data input from the input unit 50C can be stored as a file in the internal RAM having a 1,500 character capacity and in the extension unit 50E having a 2,000 character capacity. When the read/write mode is selected at step S200, the program goes to step S310 at which it is determined whether a file is accessible. In the write mode, file accessibility implies existence of a vacant space to allow a new file to be stored in the internal RAM or the extension unit 50E. In the read mode, file accessibility denotes existence of a previously recorded file. When the file is not accessible at step S310, the program goes to step S230 to resume the display of text data on the display unit 50D after displaying an error message 'Out of Access'. When the file is accessible at step S310, on the contrary, the program goes to step S320 at which text data currently stored in the text data buffer are recorded as a file in the write mode, or text data previously recorded are read to the text data buffer in the read mode.

When text data existing in the text data buffer are recorded as a file, attribute information of the text data including both the 'mode' information and 'style' information is recorded together. The attribute information stored with text data includes data representing the number of printing lines, font data, inter-character spacing data, line spacing data, and enhancement data (for example, bold, outline face, underlined, italics). In the read mode, text data are read with the attribute information to the text data buffer. When text data input from the input unit SOC already exist in the text data buffer, read-out text data are added to the end of the existing text data in the text data buffer. When the attribute information of the read-out text data is different from that of the existing text data, a discrimination mark is given to the read-out text data at step S330.

The discrimination mark designated as, for example, a rightward closed triangle includes information such as enhancement data and the inter-character spacing data. The discrimination mark assigns the attribute information previously recorded in the existing file to the text data, which are read out to be linked with the existing text data in the text data buffer having different attribute information. As a result, the read-out text data with the discrimination mark are printed according to the attribute information recorded in the existing file while the newly input text data are printed according to the different attribute information. When a new paragraph of text data is input after the read-out text data, the attribute information of the read-out text data set in the discrimination mark does not affect attribute of the newly input text data. When it is preferable to change the attribute of the read-out text data to be identical with the attribute of text data input from the input unit 50C, the discrimination mark is to be eliminated.

Figure 23:
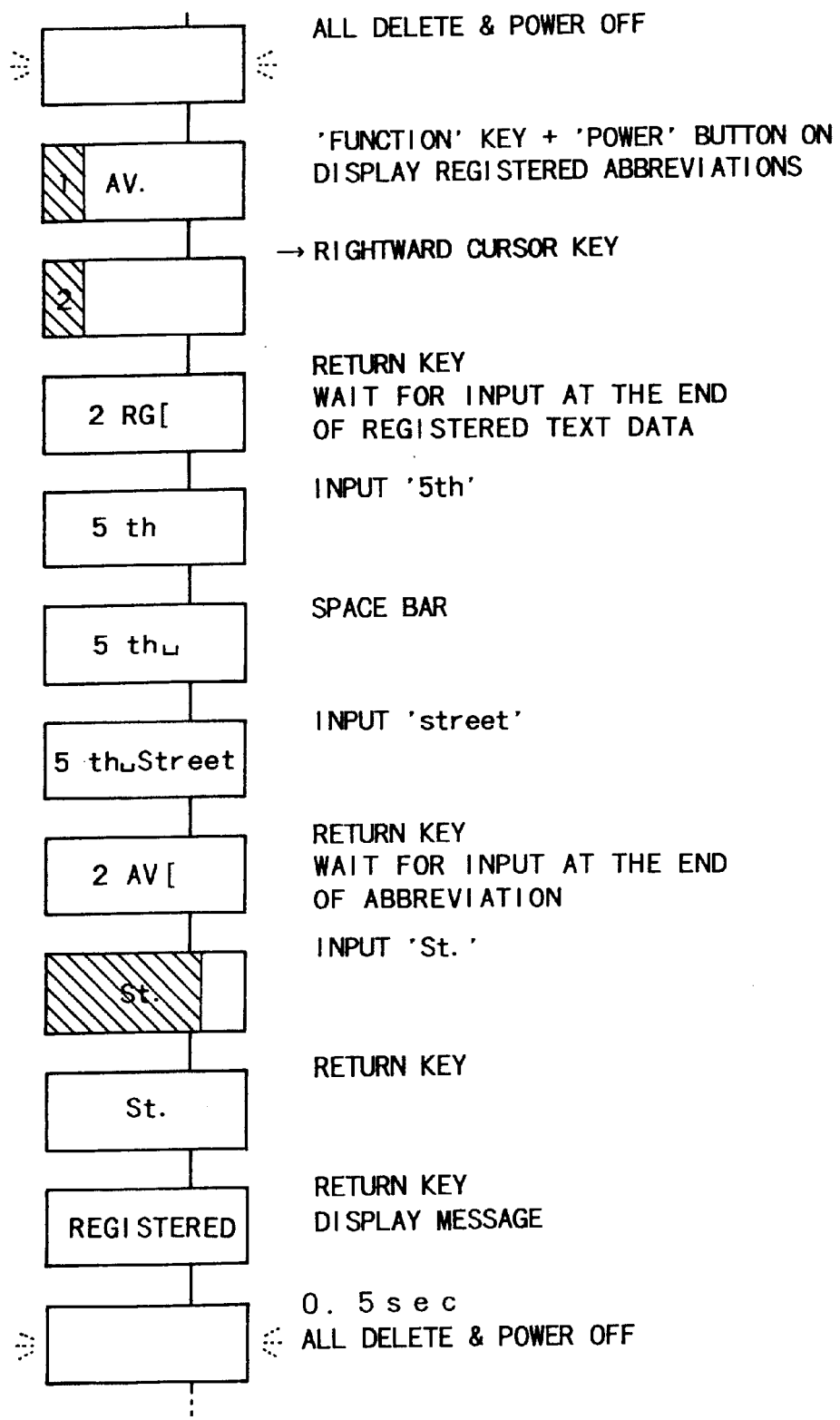
FIG. 23 shows a process of registering certain text data into a list of abbreviations by assigning a specific abbreviation thereto.
Figure 24:
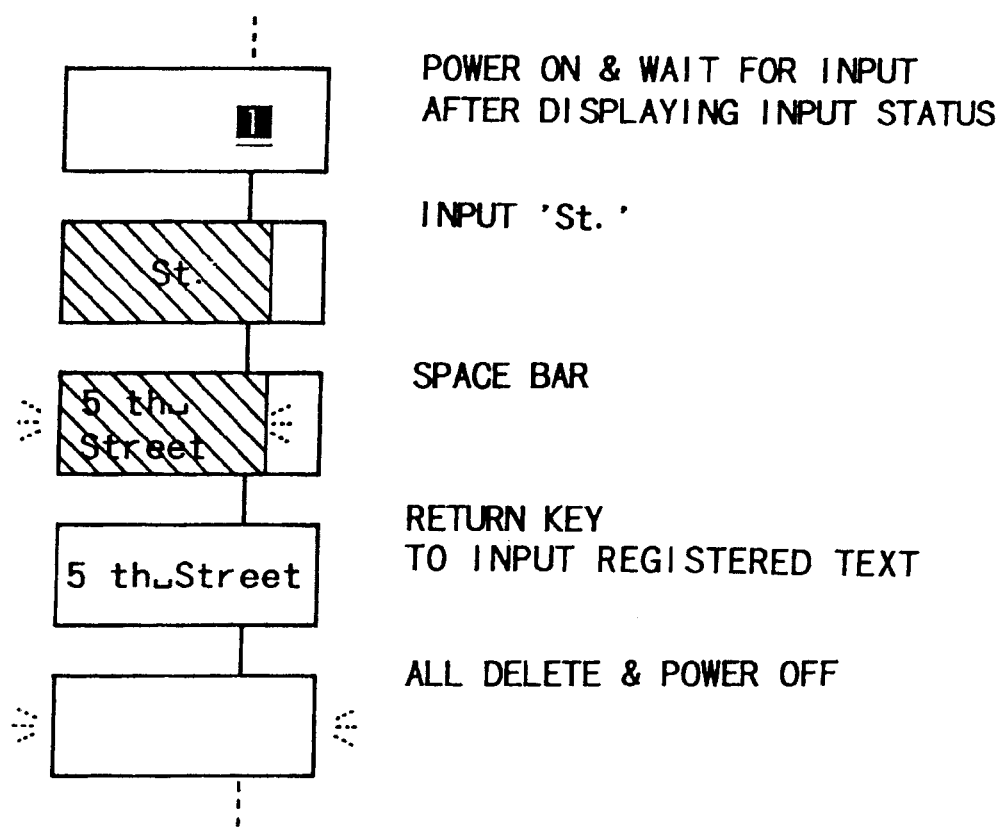
FIG. 24 shows a process of inputting the specific abbreviation to display the corresponding text data.
Figure 25:
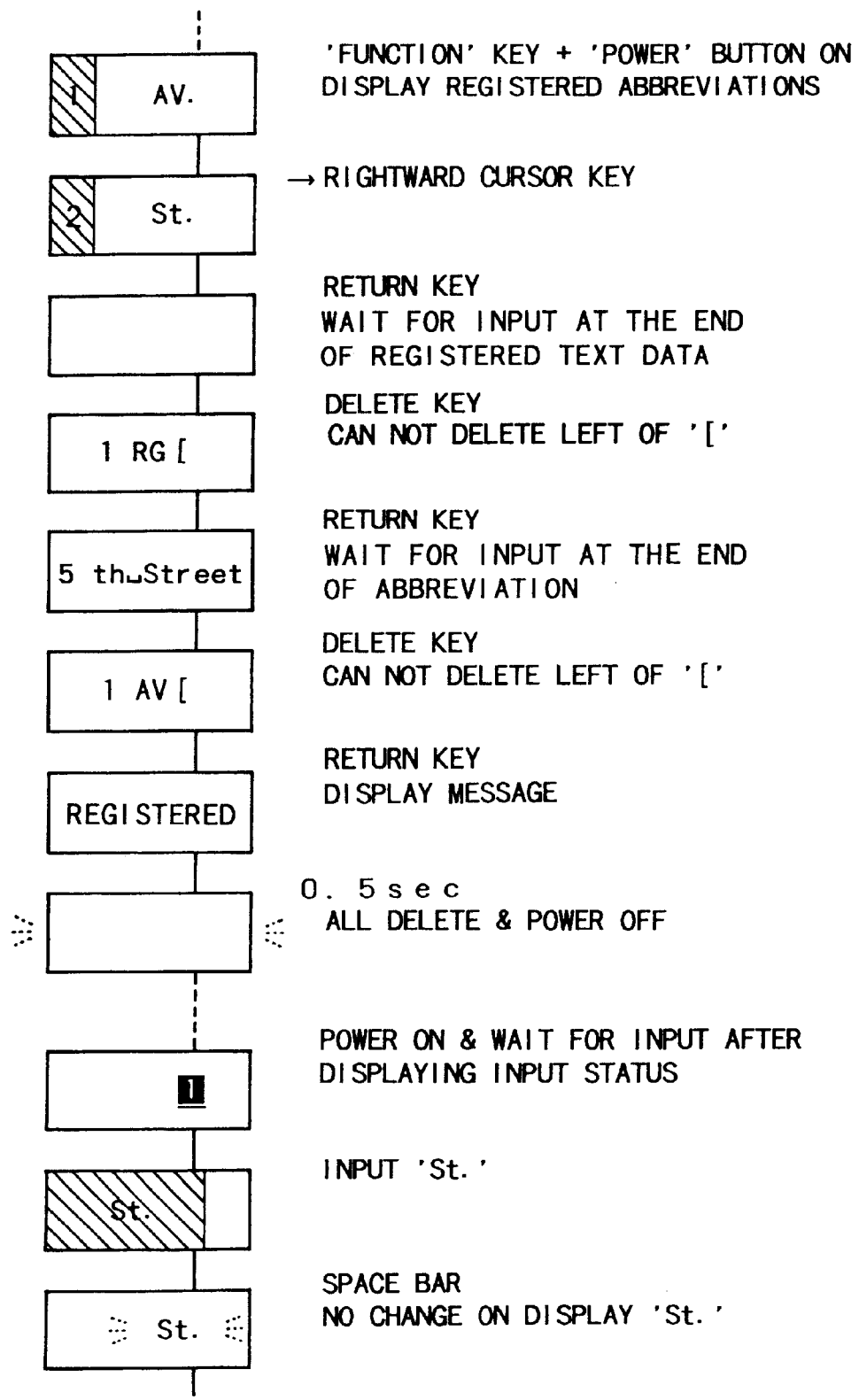
FIG. 25 shows a process of deleting the specific abbreviation from the list of abbreviations.

As a typical example of the file reading and writing process executed at step S320 in the flowchart of FIG. 10, a process of registering an abbreviation, a process of reading the registered abbreviation, and a process of deleting the registered abbreviation are shown in FIGS. 23, 24, and 25, respectively.

The tape printing device 1 of this embodiment has a registration area which can store nine abbreviations of up to 16 letters, where each abbreviation may represent text data of up to 40 letters. The user can set the abbreviation registration mode by pressing the power switch 50J simultaneously is with the 'Function' key on the input unit 50C as shown in FIG. 23. The existing abbreviations are then read out of the registration area. The user presses the rightward cursor key to find a vacant space in the registration area and inputs the whole text data to be registered and subsequently an abbreviation representing the text data.

When the user inputs an abbreviation and executes the required operation for conversion shown in FIG. 24, the original text data corresponding to the abbreviation is read out of the registration area and displayed on the display unit 50D.

The abbreviation previously registered in the registration area can be deleted easily by setting the tape printing device 1 in the abbreviation registration mode, reading out an abbreviation to be deleted, and executing the required operation shown in FIG. 25. Deletion of an abbreviation is implemented simply by overwriting blanks on the abbreviation to be deleted and the corresponding text data. The structure of the embodiment allows registration and deletion of abbreviations to be implemented by similar operations, thus reducing the time and labor required for the registration and deletion procedures. Upon condition that no abbreviation has been registered corresponding to input text data, even when the user executes the required operation for conversion, no abbreviation but only the input text data is displayed on the display unit 50D as shown in FIG. 25.

Although operations of the tape printing device 1 of the embodiment in typical modes are described above, the tape printing device 1 may also be used in other modes which are not explained here.

The tape printing device 1 of the embodiment thus constructed has the following advantages over the conventional tape printing devices. The display unit 50D of the embodiment includes the indicator element 50Db and the main display element 50Da for displaying only one line of print image as described above. The display unit 50D is approximately a quarter in size of the display unit of the conventional tape printing device used for editing text data of up to four lines.

The tape printing device 1 of the embodiment, however, has the comparable functions for editing text data on the display unit 50D to those of the conventional tape printing device having the larger display unit. The indicator element 50Db of the embodiment has the four 'Line Number' indicators. The 'Line Number' indicators on the indicator element 50Db corresponding to the existing lines of text data are turned ON to emit light whereas one of the 'Line Number' indicators corresponding to a line currently displayed on the main display element 50Da and edited is distinguished by flashing. This lighting and flashing operation on the indicator element 50Db gives sufficient information on the line numbers required for editing procedures.

It is generally not required to display all the lines of text data simultaneously for editing the plural lines of text data. The structure of the embodiment allows the user to check the total number of lines of text data to be edited as well as the line number currently displayed on the main display element 50Da by the indicators on the indicator element 40Db.

Although the small-sized display unit 50D can display only one line of text data, sufficient information required for editing a plural lines of text data is given to the user.

The structure of the embodiment may be changed or modified according to the requirements. Although the main display element 50Da of the embodiment has the capacity of displaying only one line of text data, it may be modified according to the layout of the whole tape printing device to allow two or three lines of text data to be displayed. In the latter case, the indicators on the indicator element 50Db also effectively inform the user of the total number of existing lines to be edited and the line number currently displayed on the main display element 50Da for editing procedures. In another application, the line number currently displayed and edited may be displayed before the discrimination mark. The maximum column number of text data currently edited and the column number where the cursor is positioned may also be displayed in a similar manner.

Figure 26:
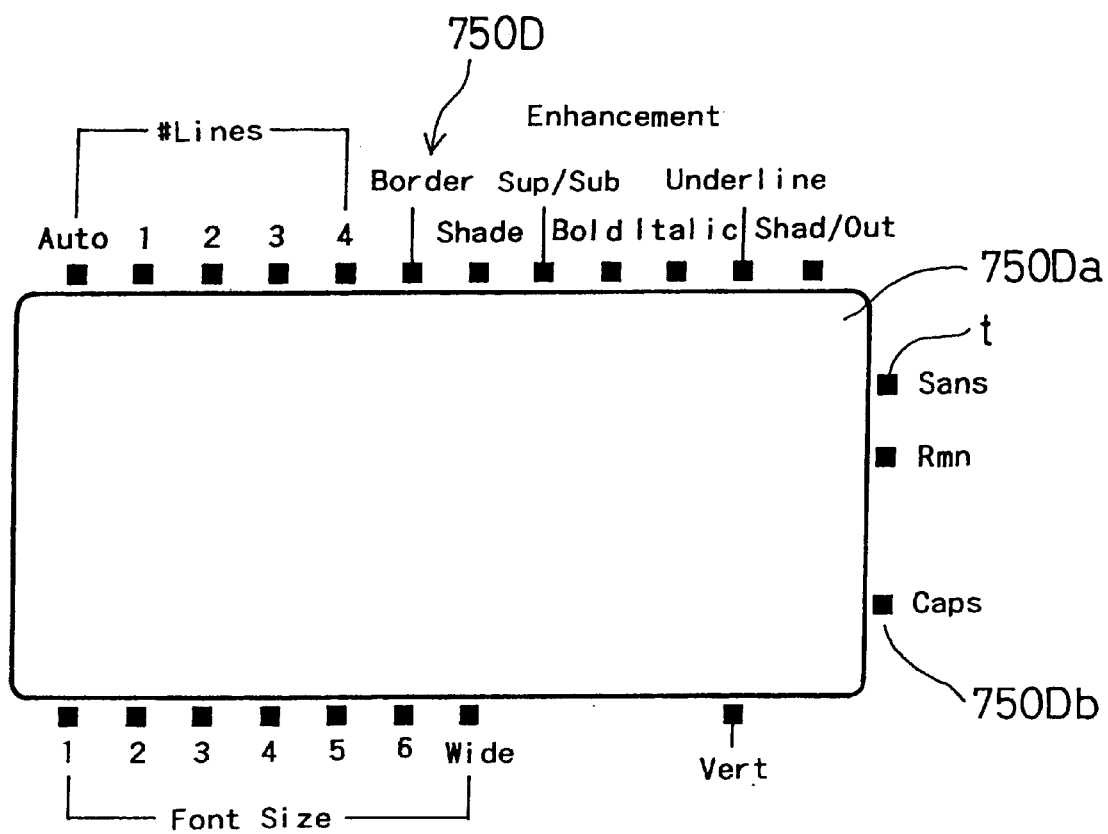
FIG. 26 shows a typical structure of a display unit 750D in a second embodiment according to the invention.

In the embodiment, text data are printed on the tape T having the adhesive rear face. The tape printing device of the embodiment may, however, be applied to other tapes, such as tapes having the adhesive layer separately applied thereon, laminate tapes having a transparent sheet for protecting the print applied thereon, and tapes specifically used for print with transferable ink. is A tape printing device 700 is described as a second embodiment according to the invention. The tape printing device 700 of the second embodiment has a display unit 750D shown in FIG. 26, which is different from the display unit 50D of the tape printing device 1 of the first embodiment. The display unit 750D includes a main display element 750Da having the capacity of displaying four lines of text data, that is, all the printable lines, and an indicator element 750Db surrounding the main display element 750Da. Indicators 't' on the indicator element 750Db respectively correspond characters and abbreviations printed thereon, which represent various functions and are different from those of the first embodiment, and emit light or flash in the same manner as the first embodiment.

The characters and abbreviations printed on the indicator element 750Db include: those representing the number of lines to be edited (Auto, 1, 2, 3, 4); those representing enhancement of printed letters (Border, Shade, etc.); those representing specification of serifs and capital letters (Rmn, SCAN, Caps), and one representing vertical print (Vert); and those representing the font size (Font Size: 1, 2, 3, 4, 5, 6, Wide).

Figure 27:
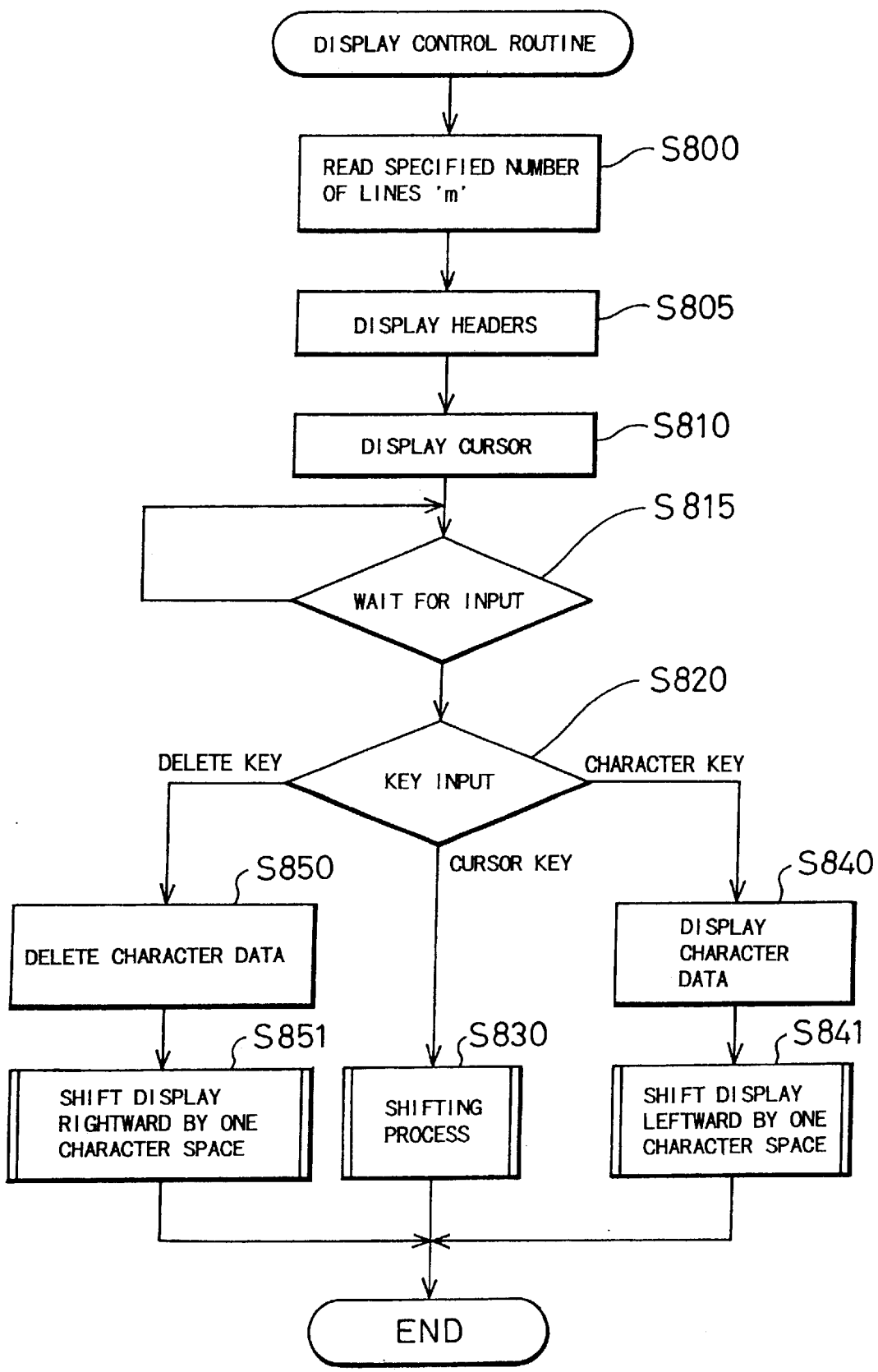
FIG. 27 is a flowchart showing a display control routine executed in the second embodiment.
Figure 28A:
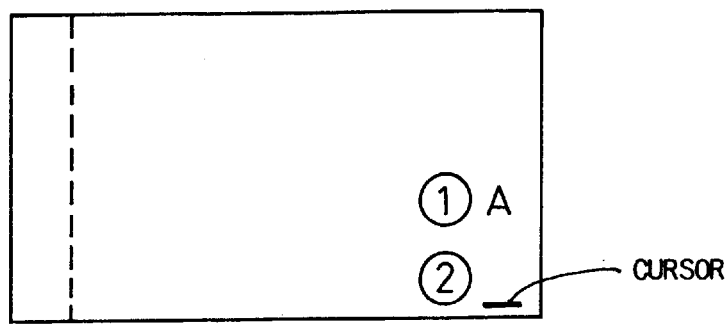
FIGS. 28A through 28D show exemplified displays according to the display control process of FIG. 27.
Figure 28B:
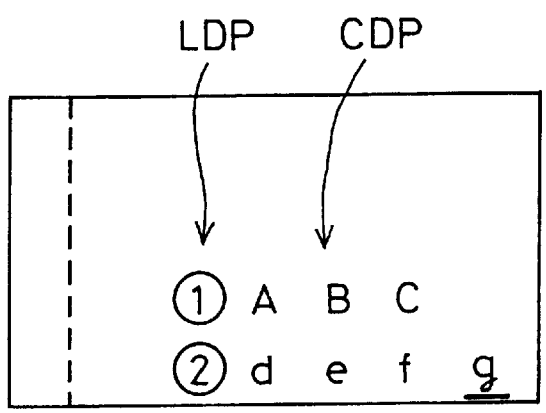
Figure 29:
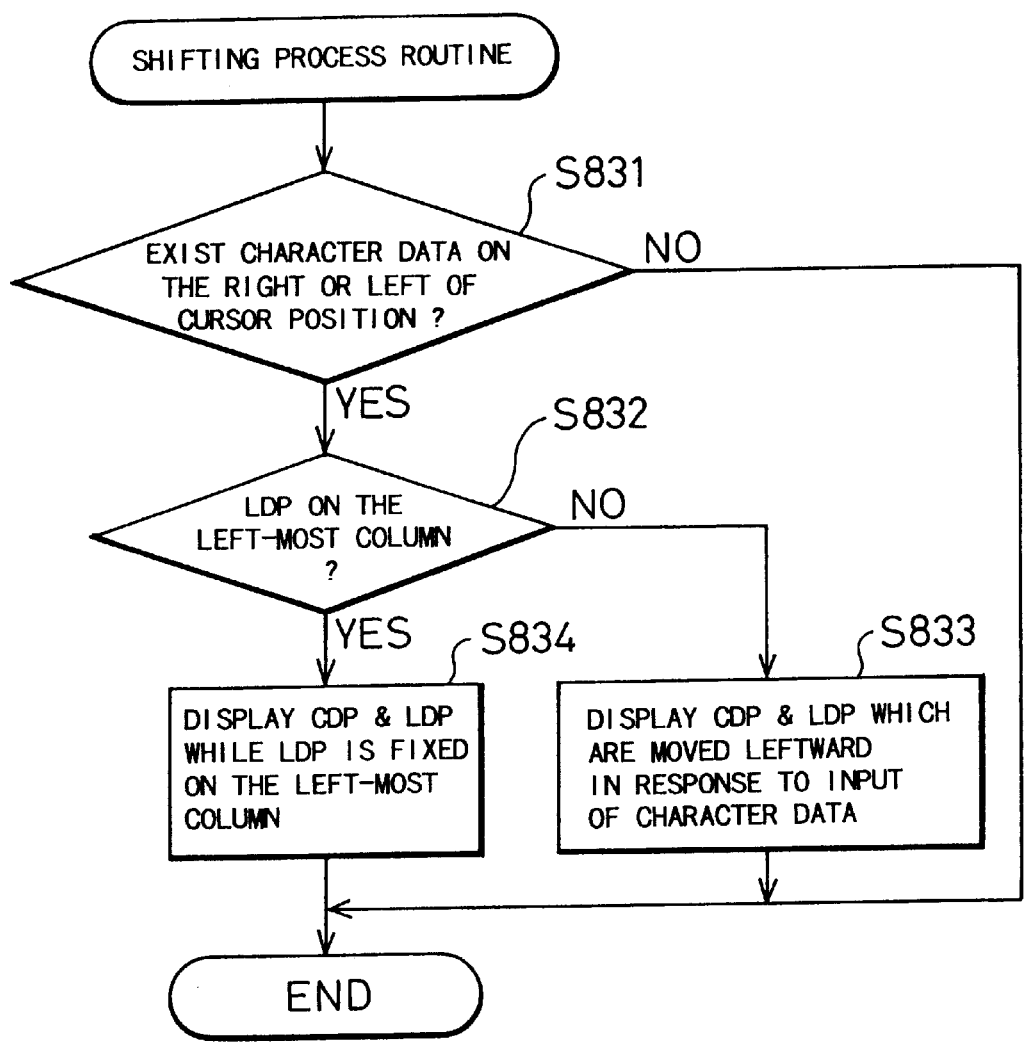
FIG. 29 is a flowchart showing a shifting process routine executed at step S830 in the flowchart of FIG. 27.

FIG. 27 is a flowchart showing a display control routine executed in the second embodiment. When the program enters the routines, the CPU 110 first reads a specified number of lines 'm' at step S800. Headers of the first line through the line currently edited are displayed on the second column from the right on the main display element 750Da at step S805, and the cursor is flashed on the right-most column of the currently edited line at step S810. FIG. 28A shows a display on the main display element 750Da when character data 'A, B, C' have already been input on the first of the four printing lines and editing starts on the second line. The tape printing device 700 then waits for an input of text data at step S815. The CPU 110 then identifies a key input from the input unit 50C at step S820. When one of the cursor keys is operated, the program goes to step S830 at which a shifting process shown in FIG. 29 is executed to shift data displayed on the main display element 750Da. Since the cursor position is fixed on the right-most column on the main display element 750Da, it is first determined whether any character data exists on the right or the left of the cursor position at step S831 in the flowchart of FIG. 29. When any character data exists on the right or the left of the cursor, the program goes to step S832 at which whether the header of each line, that is, line number data LDP, which moves with text data, is positioned on the left-most column on the main display element 750Da. When the line number data LDP is not positioned on the left-most column, the program proceeds to step S833 at which input text data CDP are displayed with the line number data LDP while the line number data LDP and the existing text data CDP are moved leftward in response to each input of text data CDP. FIG. 28B shows a display on the main display element 750Da when character data 'defg' are input on the second line.

When the line number data LDP is positioned on the left-most column on the main display element 750Da, on the contrary, the program goes to step S834 at which the input text data CDP are displayed on the second column from the left through the right-most column (that is, the column where the cursor is positioned) on the main display element 750Da while the line number data LDP is fixed on the left-most column. FIG. 28B shows a display on the main display element 750Da when character data 'hijklm' are further input after 'defg' on the second line and the head of the text data 'd' is eliminated from the display area.

When any of character keys is operated on the input unit 50C at step S820 in the flowchart of FIG. 27, the program proceeds to step S840 at which character data input on the cursor position is displayed and to step S841 at which the whole display on the main display element 750Da is shifted leftward by one character space. The method of display is varied according to the position of the line number data LDP on the main display element 750Da in the same manner as the processing of steps S832 through S834 described above. When 'Delete' key is operated on the input unit 50C at step S820, the program goes to step S850 at which character data at the cursor position is deleted and to step S852 at which the whole display on the main display element 750Da is shifted rightward by one character space. In this case, the method of display is also varied according to the position of the line number data LDP on the main display element 750D*a* in the same manner as the processing of steps S832 through S834 described above.

Figure 28C:
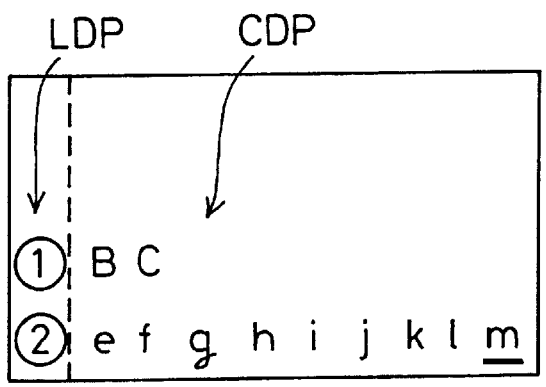
Figure 28D:
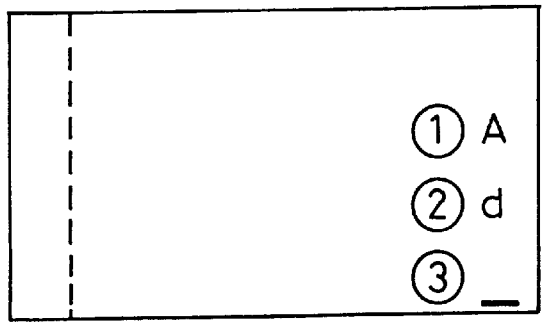

When the downward cursor key is operated upon condition that the cursor is positioned on the second line (see FIG. 28C), another line, that is, the third line, to be edited appears on the main display element 750D*a* while the cursor position is unchanged as shown in FIG. 28D. When text data consists of five or a greater number of lines, the fifth or the following line appears on the main display element 750D*a* in response to an operation of the downward cursor key whereas the first or the corresponding line disappears from the main display element 750D*a*.

While the total number of lines and the line number currently displayed and edited are indicated on the left of the main display element 50D*a* in the first embodiment, the line number is displayed with text data on the main display element 750D*a* in the structure of the second embodiment. The structure of the second embodiment distinctly informs the user of the line number currently edited. The line number data is always positioned on the head of the text data and fixed at the left-most column after the line number data reaches the left-most column on the main display element 750D*a*. This allows the user to check the column number easily. The display unit 750D of the second embodiment has the capacity of displaying the maximum of four lines, thus allowing text data to be edited readily.

Figure 30:
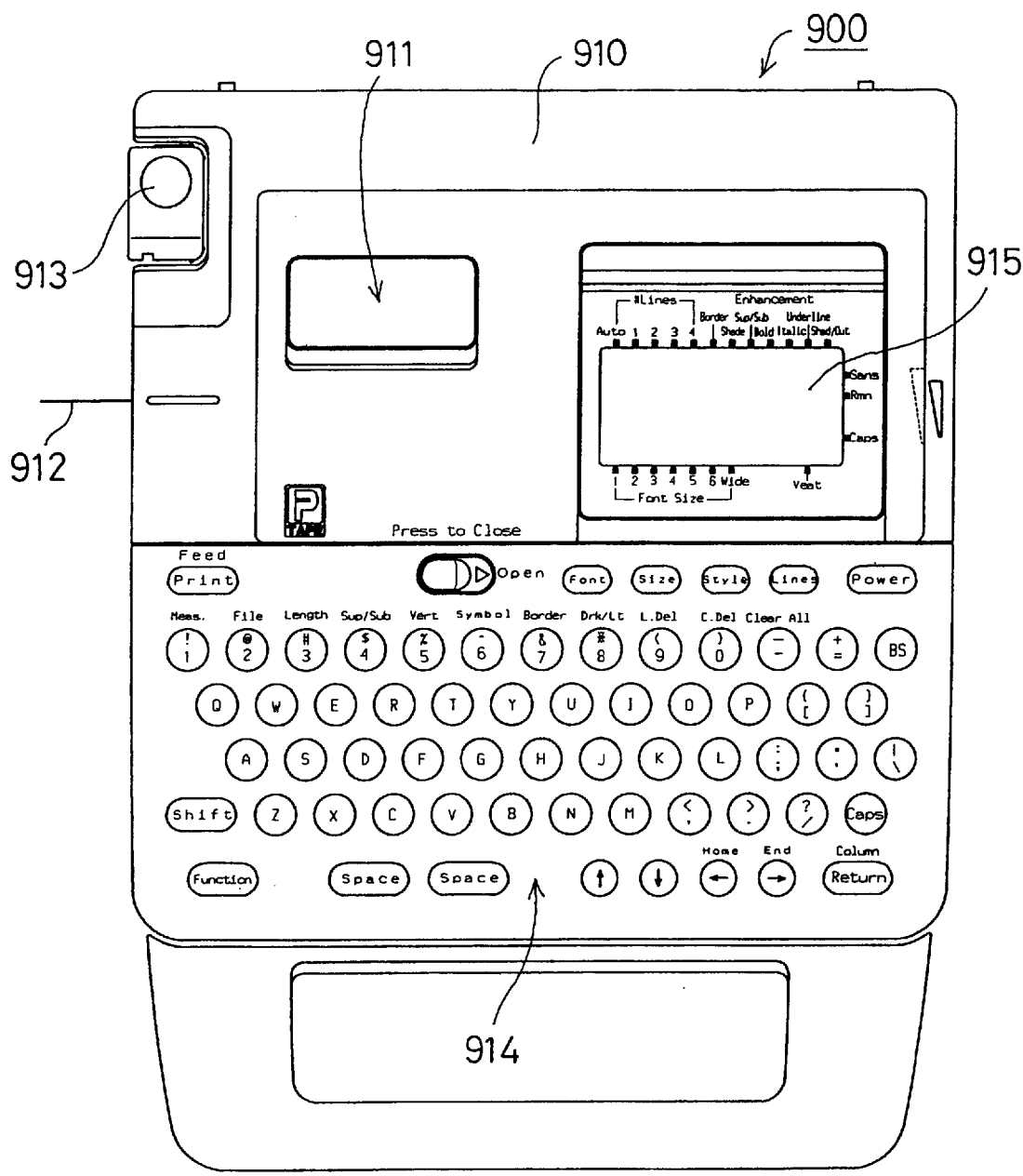
FIG. 30 is a plan view showing appearance of a tape printing device 900 as a third embodiment according to the invention.
Figure 31:
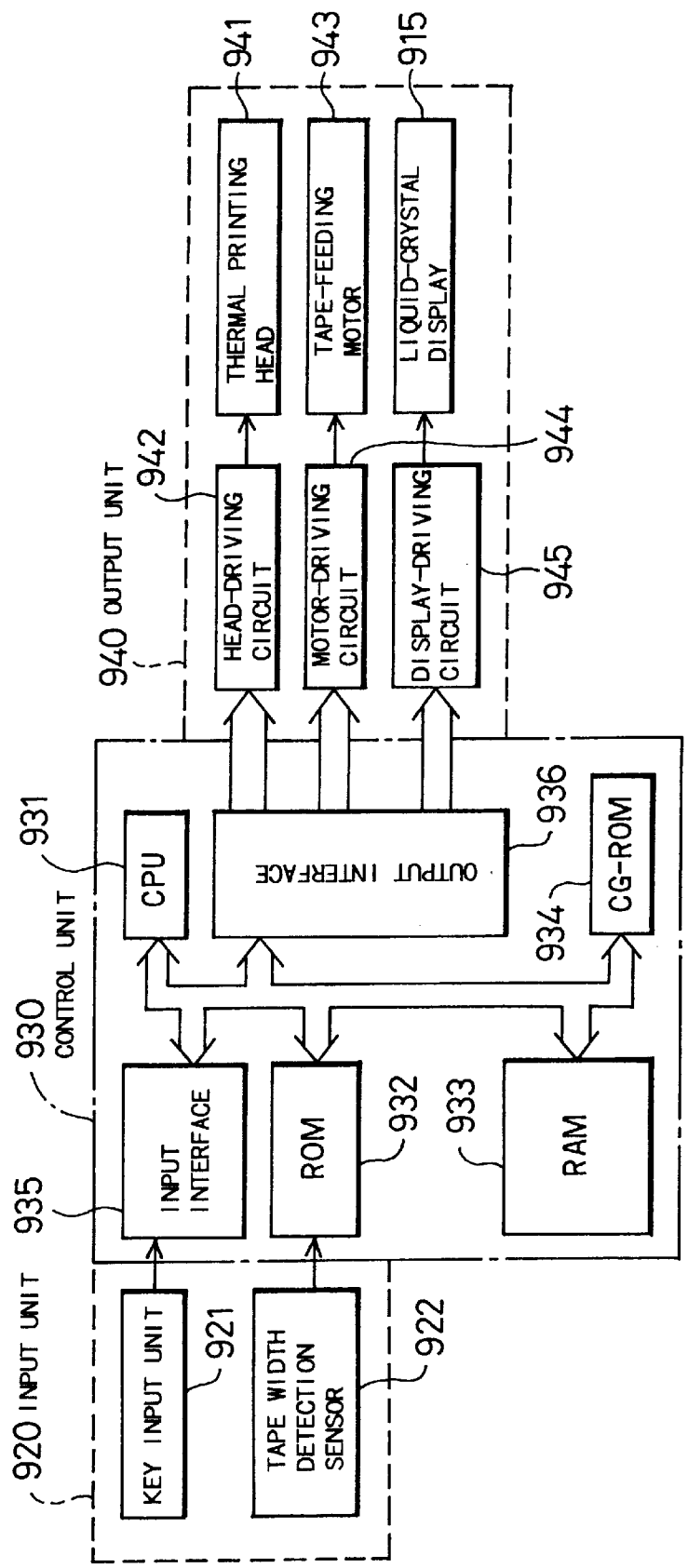
FIG. 31 is a block diagram showing electric constituents of the tape printing device 900.

A tape printing device 900 is described as a third embodiment according to the invention. The tape printing device 900 of the third embodiment has the same structure as that of the tape printing device 700 of the second embodiment. FIG. 30 is a plan view showing the appearance of the tape printing device 900, and FIG. 31 is a block diagram showing electric constituents of the tape printing device 900. As illustrated in FIG. 30, the tape printing device 900 is provided with a cover 910 and a tape cartridge holder unit 911 under the cover 910 like the tape printing device 1 of the first embodiment. A tape 912 is drawn out of a tape cartridge for printing, discharged from a tape outlet on the left side wall of the device 900, and cut in response to an operation of a cut button 913.

The tape printing device 900 has a keyboard unit 914 on which various character keys and function keys are mounted. Specific functions are assigned to several character keys which are effective only when the 'Function' key is pressed. For example, the digit key '1' has the function 'Meas' which shows and changes the unit of length of the tape 912. A display unit 915 of the tape printing device 900, which is identical with the display unit 750D of the second embodiment, is a black and white liquid-crystal display having the capacity of displaying the maximum of four lines.

Referring to the block diagram of FIG. 31, the tape printing device 900 includes an input unit 920, a control unit 930, and an output unit 940 in its electric configuration. The control unit 930 receives data from the input unit 920, executes the required processing, and outputs the results of the processing to the output unit 940, which displays or prints the outputs transmitted from the control unit 930.

The input unit 920 includes a key input unit 921 receiving various signals sent from the keyboard unit 914 shown in FIG. 30, and a tape width detection sensor 922. The key input unit 921 outputs various character code data and control data to the control unit 930. The tape width detection sensor 922 detects the width of the tape set in the tape printing device 900 and outputs the tape width information to the control unit 930.

The output unit 940 includes a thermal printing head 941, a head-driving element 942 for driving the printing head 941, a tape-feeding motor 943 for rotating a platen to feed the tape, a motor-driving element 944 for driving the tape feeding motor 943, the liquid-crystal display unit 915, and a display-driving circuit 945 for actuating the liquid-crystal display unit 915.

The control unit 520 is typically constructed as a microcomputer and includes a CPU 931, a ROM 932, a RAM 933, a character generator ROM (CG-ROM) 934, an input interface element 935, and an output interface element 936, which are connected to one another via a system bus. Various operation programs and fixed data are stored in the ROM 932.

The RAM 933 is used as a working memory and stores data input by the user. The CG-ROM 934 stores dot patterns of characters and symbols prepared for the tape printing device 900, and outputs a corresponding dot pattern in response to an input of code data representing a character or symbol. Separate CG-ROMs may be used for display and printing. The input interface element 935 works as an interface between the input unit 920 and the control unit 930 whereas the output interface element 936 functions as an interface between the control unit 930 and the output unit 940.

The CPU 931 receives input signals from the input unit 920 and data stored in the ROM 932 or the RAM 933, and executes the required processing based on the operation programs stored in the ROM 932 using the RAM 933 as the working area. The progress or result of the processing is displayed on the display unit 915 or printed on the tape 912.

Figure 32:
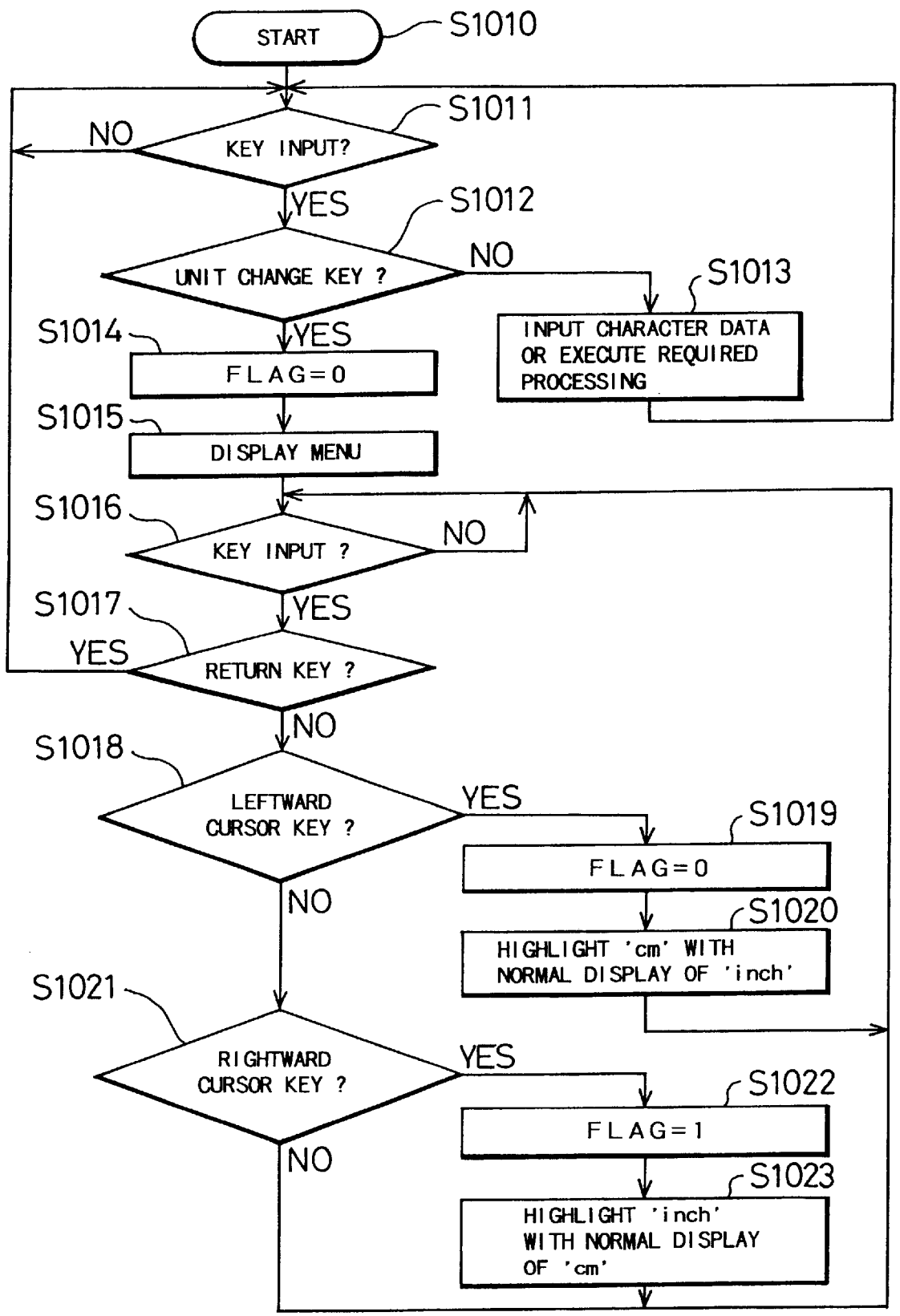
FIG. 32 is a flowchart showing a process routine executed by the tape printing device 900 of the third embodiment.

FIG. 32 is a flowchart showing a process routine executed by the tape printing device 900 of the third embodiment. This process routine changes the unit of length of the tape on the display unit 915. The tape printing device 900 has a function of changing the unit of length applied to display of the tape length, which is calculated based on the number of input character data and specification of font and character size.

When the program enters the routine, the tape printing device 900 waits for a key input at step S1011. When the user operates any key on the keyboard unit 914, it is determined whether a 'Unit Change' key function is activated at step S1012. Although the 'Unit Change' key function is realized by pressing the 'Function' key and the digit key '1' in this embodiment, a separate 'unit Change' key may be mounted on the keyboard unit 914. When the key input is not the 'Unit Change' key function at step S1012, the program goes to step S1013 to display character data corresponding to the input character key or execute required processing according to the input function key.

Figure 33:
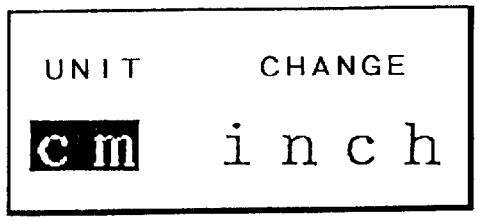
FIG. 33 shows a menu where the unit 'cm' is highlighted.

When the 'Unit Change' key function is activated at step S1012, the program goes to step S1014 at which a flag FLAG is set equal to zero and to step S1015 at which the tape printing device 900 displays a menu to request the user to select the unit of length. In this embodiment, 'cm' and 'inch' are shown as possible choices on the liquid-crystal display unit 915 as shown in FIG. 33, where one choice 'cm' is highlighted as a default. The tape printing device 900 again waits for a key input at step S1016 after the display of the menu. When the 'Return' key, which functions as 'Select' key, is pressed at step S1017, the highlighted choice 'cm' is fixed as the unit of length and the program returns to step S1011 to wait for another key input.

Figure 34:
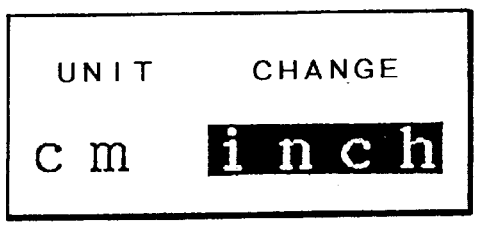
FIG. 34 shows a menu where the unit 'inch' is highlighted.

When the leftward cursor key is pressed while the menu is displayed on the display unit 915 at step S1018, the program goes to step S1019 at which the flag FLAG is set equal to zero and to step S1020 at which the choice 'cm' is highlighted on the display unit 915 as shown in FIG. 33. When the rightward cursor key is pressed while the menu is displayed on the display unit 915 at step S1021, on the other hand, the program goes to step S1022 at which the flag FLAG is set equal to one and to step S1023 at which the choice 'inch' is highlighted on the display unit 915 as shown in FIG. 34. The program then returns to step S1016 to wait for another key input.

Figure 35:
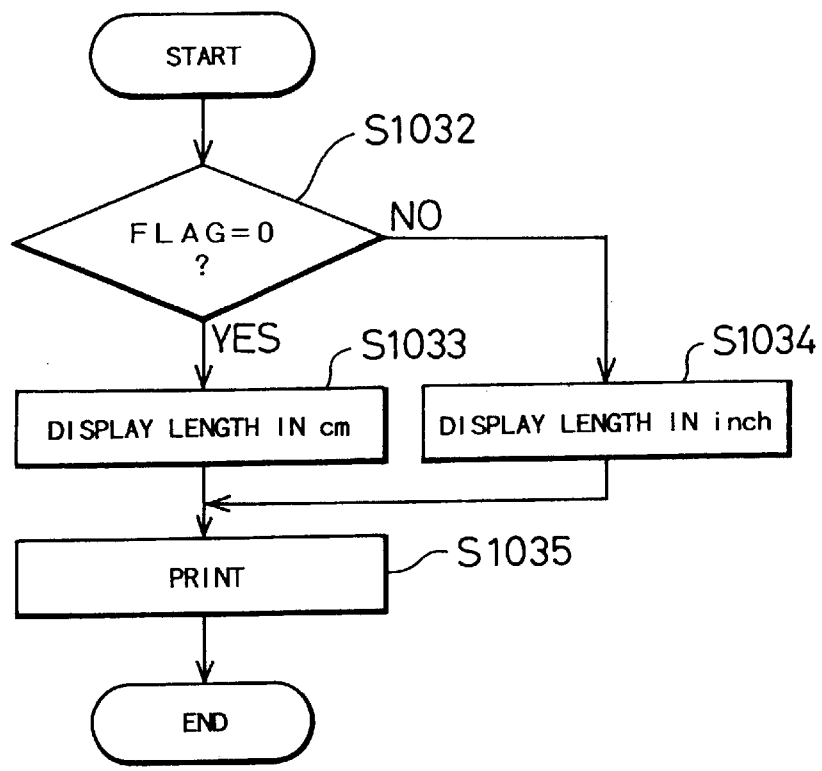
FIG. 35 is a flowchart showing a printing process in the third embodiment.

When the 'Print' key is operated at step S1011, the program enters a printing process routine, which is executed at step S1013 in the flowchart of FIG. 32 and shown in the flowchart of FIG. 35. In response to an operation of the 'Print' key, it is determined whether the flag FLAG is equal to zero at step S1032. The flag FLAG=0 represents selection of 'cm' in metric system as the unit whereas FLAG=1 denotes selection of 'inch' in inch-yard system. When FLAG=0 at step S1032, the program goes to step S1033 at which the length of the tape is shown by 'cm'. When FLAG=1 at step S1032, on the contrary, the program goes to step S1034 at which the tape length is shown by 'inch'.

FIG. 36 shows an exemplified display by 'cm' and FIG. 37 shows one by 'inch'. The CPU 931 calculates required blanks based on the number of input character data and specification of the font and character size, determines a required tape length in the selected unit or dot number, and displays the tape length on the liquid-crystal display unit 915. For the display by 'cm', millimeter is used for the length below '1 cm'. For the display by 'inch', fractions like ½ and ⅜ are used for the length below '1 inch'. These values are determined by referring to a conversion table previously stored in the ROM 932. The conversion table is used for the conversion between the dot number, 'cm' and 'inch' as shown in FIG. 38. After the processing at step S1033 or S1034, the program goes to step S1035 at which the tape printing device 900 executes the printing operation to print text data on the tape. The program then goes to 'END' to exit from the routine.

The structure of the embodiment allows the user to readily check and determine the length of the tape 912 required for printing by a desired unit. The unit of length is easily changed between a plural choices, which are displayed on the display unit 915.

Figure 39:
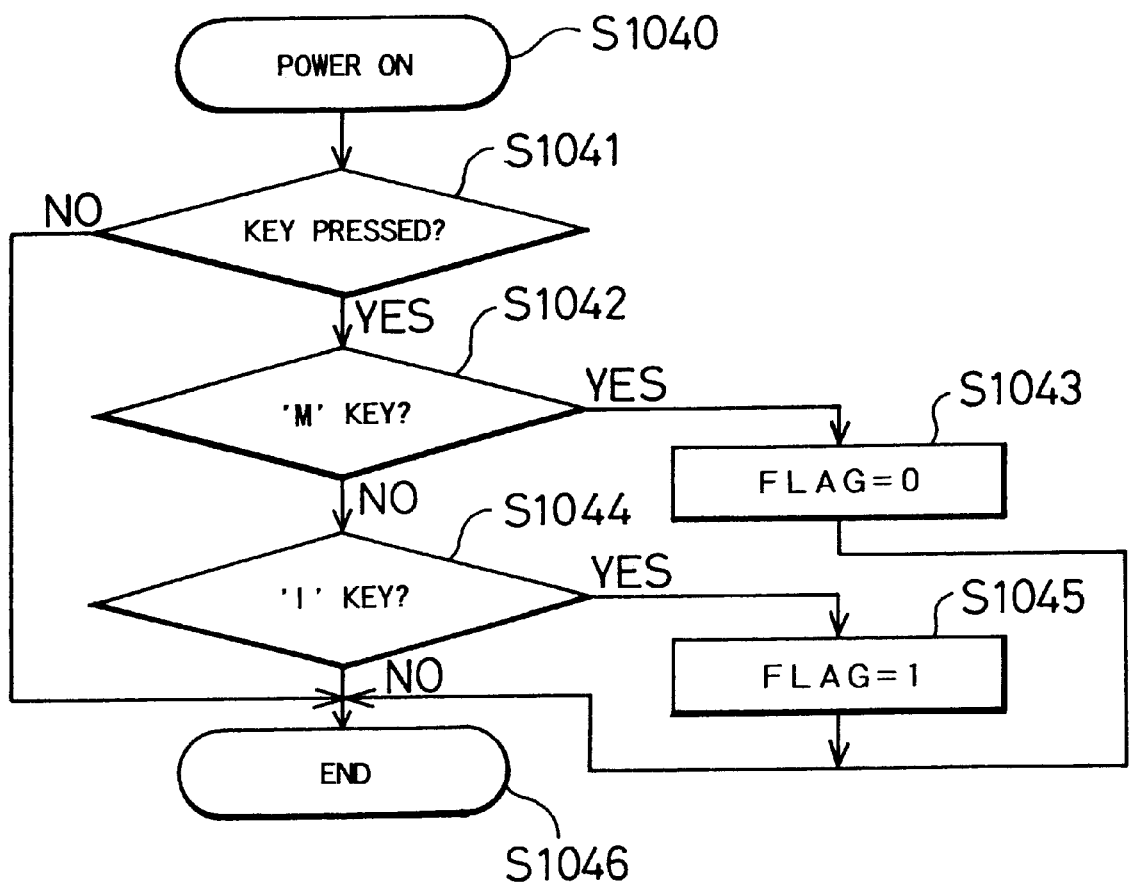
FIG. 39 is a flowchart showing another process of setting the unit of length.

Although the 'Unit Change' key function is activated by the certain key operation in the embodiment, the unit of length may be changed by a key pressed simultaneously with the 'Power' button as shown in the flowchart of FIG. 39. When the power is turned ON at step S1040, the control unit 930 determines whether any key is pressed at step S1041. When any key is pressed, the program successively goes to steps S1042 and S1044 to determine whether the key is 'M' or 'I'. When the key 'M' representing the metric system is pressed, the program goes to step S1043 to set the flag FLAG equal to zero. When the key 'I' representing the inch-yard system is pressed, the program goes to step S1045 to set the flag FLAG equal to one. The program then goes to 'END' to exit from the routine.

This structure sets the flag FLAG according to the key pressed simultaneously with the 'Power' button. In this structure, the length of the tape is also displayed by either 'cm' or 'inch' in the printing process shown in FIG. 35. For change of the unit, after the input text data are stored in a file and the tape printing device 900 is once turned OFF, the power is turned ON again with the press of either the 'M' or 'I' key.

This structure allows a desired unit of length to be set only by pressing the 'I' or 'M' key representing each measuring unit when the device 900 is switched ON.

There may be many modifications, alterations, and changes without departing from the scope or spirit of essential characteristics of the invention. It is thus clearly understood that the above embodiments are only illustrative and not restrictive in any sense. The scope and spirit of the present invention are limited only by the terms of the appended claims.

What is claimed is:

1. A method of printing data on a tape using a tape printing device with a display unit comprising:

receiving input print data to be printed;

displaying said input print data on the display unit;

calculating a print length of the tape which includes the print data to be printed thereon and a predetermined length of blank tape;

displaying the print length of the tape on said display unit after manual operation of a print key which commences the printing of the print data; and automatically after the initial displaying, printing the print data on the tape.

2. A method in accordance with claim 1, further including:

selecting a unit of length for the print length of the tape, among plurality of units of length provided in advance, and displaying the selected unit of length with the displayed print length of the tape.

3. A method in accordance with claim 2, further including:

identifying a key operated at a time of power supply; and selecting the unit of length, based on the identified key.

4. A method in accordance with claim 1, further including:

displaying the number of labels with print data thereon on the display unit, which are successively cut from the tape together with the print length of the tape for each label.

5. A method in accordance with claim 1, further including:

displaying on the display unit a width of the tape used for printing together with the print length of the tape.

6. A tape printing assembly comprising:

a data input device adapted to input print data to be printed;

a display unit to display said input print data;

a calculating device adapted to calculate a print length of the tape which includes the print data to be printed thereon and a predetermined length of blank tape;

a display control unit to display the print length of the tape on said display unit, prior to printing of the print data;

a printing device configured to print the print data on the tape; and a print activator coupled to the display control unit to immediately display the print length of the tape on the display unit, and operably coupled to the printing device to commence printing of the print data after the display of the print length.

7. A tape printing assembly in accordance with claim 6, further including:

a unit selector coupled to the calculating device to convert said print length into a displayed length of a selected unit of length selected from at least two different choices of units of length.

8. A tape printing assembly in accordance with claim 7, further including:

a plurality of activation devices each corresponding to a respective unit of length of said at least two different choices of units of length; and a switching mechanism coupled to said unit selector and said activation devices, and adapted to switch to a selected unit of length during simultaneous activation of a corresponding activation device and powering up of said printing device.

9. A tape printing device in accordance with claim 8 wherein, said activation devices include corresponding keys of a key pad.

10. A tape printing device in accordance with claim 6 wherein, said calculating device is further adapted to display on the display unit a width of the tape used for printing together with the print length of the tape.

11. A method of printing data on a tape using a tape printing device with a display unit comprising receiving input print data to be printed;

displaying said input print data on the display unit;

calculating a print length of the tape which includes the print data to be printed thereon and a predetermined length of blank tape;

providing a selection of a unit of length for the print length of the tape, among plurality of units of length in advance, displaying the print length of the tape, in a selected unit, on said display unit after manual operation of a print key which commences the printing of the print data; and automatically after the initial displaying, printing the print data on the tape.

12. A method in accordance with claim 11, further including:

identifying a key operated at a time of power supply; and selecting the unit of length, based on the identified key.

13. A method in accordance with claim 11, further including:

displaying on the display unit a width of the tape used for printing together with the print length of the tape.

14. A tape printing assembly comprising:

a data input device adapted to input print data to be printed;

a display unit to display said input print data;

a calculating device adapted to calculate a print length of the tape which includes the print data to be printed thereon and a predetermined length of blank tape;

a display control unit to display the print length of the tape on said display unit, prior to printing of the print data;

a printing device configured to print the print data on the tape;

a print activator coupled to the display control unit to immediately display the print length of the tape on the display unit, and operably coupled to the printing device to commence printing of the print data after the display of the print length; and a unit selector coupled to the calculating device to convert said print length into a displayed length of a selected unit of length selected from at least two different choices of units of length.

15. A tape printing assembly in accordance with claim 14, further including:

a plurality of activation devices each corresponding to a respective unit of length of said at least two different choices of units of length; and a switching mechanism coupled to said unit selector and said activation devices, and adapted to switch to a selected unit of length during simultaneous activation of a corresponding activation device and powering up of said printing device.

16. A tape printing device in accordance with claim 14 wherein, said calculating device is further adapted to display on the display unit a width of the tape used for printing together with the print length of the tape.

* * * * *